US010520934B2

(12) United States Patent
Seki et al.

(10) Patent No.: US 10,520,934 B2
(45) Date of Patent: Dec. 31, 2019

(54) PLANT PERFORMANCE EVALUATION APPARATUS, PLANT PERFORMANCE EVALUATION SYSTEM, AND PLANT PERFORMANCE EVALUATION METHOD

(71) Applicant: YOKOGAWA ELECTRIC CORPORATION, Tokyo (JP)

(72) Inventors: Tatenobu Seki, Tokyo (JP); Mitsuhiro Yamamoto, Tokyo (JP); Yoshihisa Hidaka, Tokyo (JP); Nobuaki Ema, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 419 days.

(21) Appl. No.: 15/417,365

(22) Filed: Jan. 27, 2017

(65) Prior Publication Data

US 2017/0227954 A1    Aug. 10, 2017

(30) Foreign Application Priority Data

Feb. 5, 2016  (JP) ................................ 2016-021116

(51) Int. Cl.
   *G05B 23/02*    (2006.01)
   *G05B 13/04*    (2006.01)
(52) U.S. Cl.
   CPC ....... *G05B 23/0243* (2013.01); *G05B 13/041* (2013.01)
(58) Field of Classification Search
   CPC ........................ G05B 23/0243; G05B 13/041
   (Continued)

(56) References Cited

U.S. PATENT DOCUMENTS 3,356,667 A * 12/1967 Smith .................. B01J 19/0006
                                                       526/60
2005/0240382 A1  10/2005 Nakaya et al.
2013/0325158 A1* 12/2013 Kobayashi ......... G05B 23/0243
                                                       700/108

FOREIGN PATENT DOCUMENTS

JP       11-003113 A    1/1990
JP       2723316 B2     3/1998
           (Continued)

OTHER PUBLICATIONS

Mirror_Plant_2014 (Mirror Plant Solutions Omega Simulation Co., Ltd. Downloaded from https://web.archive.org/web/20140726181908/https://www.omegasim.co.jp/contents_a/sol ... Dated Jul. 26, 2014).*

(Continued)

*Primary Examiner* — Brian S Cook
(74) *Attorney, Agent, or Firm* — Sughrue Mion, PLLC

(57) ABSTRACT

A plant performance evaluation apparatus includes a first storage storing a first static model indicating a model of a first steady state in a plant, a second storage storing a first dynamic model indicating a model of a dynamic state of the plant, a model converter configured to convert the first dynamic model to a second static model indicating a model of a second steady state of the plant, and to store the second static model into the first storage, the first steady state indicating a steady state of the plant temporally before the second steady state, a comparator configured to compare parameters included in the first static model with parameters included in the second static model and to output a comparison result, and a display configured to display the comparison result output from the comparator.

13 Claims, 15 Drawing Sheets

(58) Field of Classification Search
USPC .......................................................... 703/6
See application file for complete search history.

(56) References Cited

FOREIGN PATENT DOCUMENTS

| | | | |
|---|---|---|---|
| JP | 2008-065588 | A | 3/2008 |
| JP | 2009-053938 | A | 3/2009 |
| JP | 4789277 | B2 | 10/2011 |
| JP | 2013-250695 | A | 12/2013 |
| JP | 5696385 | B2 | 4/2015 |

OTHER PUBLICATIONS

Tanks_2015 (wedotanks.com, LLC downloaded from https://wedotanks.com/eq-tanks-equalization-tanks.html, waybackmachine archive dated May 2, 2015).*
Makoto_2013 (Mirror Plant for Innovating Plant Operation Sep. 2013).*
Steady-State_2015 ( Steady_State defined archived Wikipedia page dated Oct. 19, 2015 downloaded from https://en.wikipedia.org/w/index.php?title=Steady_state&oldid=686505532).*
Mirror_Plant_2014 (Mirror Plant Solutions Omega Simulation Co., Ltd. Downloaded from https://web.archive.org/web/20140726181908/https://www.omegasim.co.jp/contents_a/sol . . . Dated Jul. 26, 2014) (Year: 2014).*
Tanks_2015 (wedotanks.com, LLC downloaded from https://wedotanks.com/eq-tanks-equalization-tanks.html, waybackmachine archive dated May 2, 2015). (Year: 2015).*
Makoto_2013 (Mirror Plant for Innovating Plant Operation Sep. 2013). (Year: 2013).*
Steady-State_2015 ( Steady State defined archived Wikipedia page dated Oct. 19, 2015 downloaded from https://en.wikipedia.org/w/index.php?title=Steady_state&oldid=686505532). (Year: 2015).*
Katsumi Yokoyama et al., ""Visual Modeler" Dynamic Simulator Added with Steady State Simulation Function", Yokogawa technical report, 2008, pp. 31-34, vol. 52, No. 1.
Tatenobu Seki et al., "Innovative Plant Operations by Using Tracking Simulators", Yokogawa technical report, 2008, pp. 35-38, vol. 52, No. 1.

* cited by examiner

| DEVICE | PARAMETER | TIME OF DESIGN | CURRENT |
|---|---|---|---|
| HEAT EXCHANGER | EA101 OVERALL HEAT TRANSFER COEFFICIENT U | 600 | 500 |
| : | EA102 OVERALL HEAT TRANSFER COEFFICIENT U | 800 | 600 |
| : | : | | |
| REACTION VESSEL | DA101 REACTION RATE COEFFICIENT K (CATALYST) | 1.0 | 0.8 |
| DISTILLATION COLUMN | DA301 PRESSURE LOSS COEFFICIENT | 10 | 15 |
| : | DA302 PRESSURE LOSS COEFFICIENT | 10 | 13 |
| PUMP | PA401 EFFICIENCY | 80 | 75 |
| : | PA402 EFFICIENCY | 80 | 78 |
| COMPRESSOR | CA101 EFFICIENCY | 85 | 70 |
| | | | |

PLANT PERFORMANCE EVALUATION APPARATUS, PLANT PERFORMANCE EVALUATION SYSTEM, AND PLANT PERFORMANCE EVALUATION METHOD

BACKGROUND OF THE INVENTION

Field of the Invention

The present invention relates to a plant performance evaluation apparatus, a plant performance evaluation system, and a plant performance evaluation method, and particularly to a plant performance evaluation apparatus, a plant performance evaluation system, and a plant performance evaluation method capable of grasping and comparing the current states of process units in a plant with the states at the time the plant was designed, or past process unit states during operation.

The present application claims priority based on Japanese patent application 2016-021116, filed on Feb. 5, 2016 and includes herein by reference the content thereof.

Description of Related Art

Because of the change in equipment performance caused by aging in a plant, in order to achieve the designed performance at the start of operation, corrective construction is necessary over a period of use of approximately 30 years. However, there have been cases in which it is not possible to grasp the deterioration of which of the plurality of process units constituting a plant is affecting to cause a decrease of the plant performance, and to judge which part of the plant should be corrected so that the designed performance at the start of operation is achieved.

There have also been cases in which there is not only the need to return the plant to the designed performance at the start of operation, but also a requirement to extend the plant equipment and to adopt process units having the latest functionality during the period of use. In such cases, it is necessary to consider what type of equipment modification is necessary, in accordance with the current state of the plant. For that reason, it is necessary to grasp to what extent the plant state has changed from the time operation was started.

For example, Japanese Patent No. 2723316 discloses an apparatus that makes a performance diagnosis of an electrical generation plant. In that apparatus, measurement data is collected at prescribed intervals when the electrical generation plant is sufficiently established, and the average value of the measurement data is used to calculate an efficiency value. Next, by comparing the calculated efficiency value with a pre-established reference value, this apparatus makes a performance evaluation of the electrical generation plant. In cases in which the purpose of use is limited, such as in this electrical generation plant, it is relatively easy to evaluate the performance. However, in a plant used for wide-ranging purposes, such as in a chemical plant that manufactures a plurality of types of chemical products, it is not easy to perform an evaluation of performance.

SUMMARY OF THE INVENTION

One aspect of the present invention provides a plant performance evaluation apparatus, a plant performance evaluation system, and a plant performance evaluation method capable of grasping current states of process units in a plant and comparing the current states of process units with the states at the time the plant was designed or past process unit states during operation.

A plant performance evaluation apparatus according to an aspect of the present invention may include a first storage storing a first static model indicating a model of a first steady state in a plant, a second storage storing a first dynamic model indicating a model of a dynamic state of the plant, a model converter configured to convert the first dynamic model to a second static model indicating a model of a second steady state of the plant, and to store the second static model into the first storage, the first steady state indicating a steady state of the plant temporally before the second steady state, a comparator configured to compare parameters included in the first static model with parameters included in the second static model and to output a comparison result, and a display configured to display the comparison result output from the comparator.

The above-noted plant performance evaluation apparatus may further include an operating condition equalizer configured to equalize the operating conditions of the first static model and the operating conditions of the second static model. The comparator may be configured to compare the first static model and the second static model which had been equalized by the operating condition equalizer.

In the above-noted plant performance evaluation apparatus, the model converter may be configured to invalidate parameters with time dependence included in the first dynamic model to convert the first dynamic model to the second static model.

In the above-noted plant performance evaluation apparatus, the first static model may be generated at the time the plant was designed.

The above-noted plant performance evaluation apparatus may further include a dynamic simulator configured to simulate operation in the dynamic state of the plant using the first dynamic model.

The above-noted plant performance evaluation apparatus may further include a tracking simulator configured to simulate operation in the dynamic state of the plant using the first dynamic model and based on the simulation result, to adjust parameters included in the first dynamic model.

In the above-noted plant performance evaluation apparatus, the comparator may be configured to compare the parameters included in the first static model with the parameters included in the second static model and to extract parameters having a difference.

In the above-noted plant performance evaluation apparatus, the model converter may be configured to convert the first static model to generate the first dynamic model.

In the above-noted plant performance evaluation apparatus, the operating condition equalizer may be configured to cause the operating conditions of the first static model to coincide with the operating conditions of the second static model.

In the above-noted plant performance evaluation apparatus, the operating condition equalizer may be configured to cause the operating conditions of the second static model to coincide with the operating conditions of the first static model.

In the above-noted plant performance evaluation apparatus, the first static model may be generated at the time of operating the plant.

In the above-noted plant performance evaluation apparatus, the model converter may be configured to convert the first static model to the first dynamic model, based on the first static model and change history information of process units included in the plant.

A plant performance evaluation system according to an aspect of the present invention may include a plant performance evaluation apparatus, a first database, and a second database. The plant performance evaluation apparatus may include a first storage storing a first static model indicating a model of a first steady state in a plant, a second storage storing a first dynamic model indicating a model of a dynamic state of the plant, a model converter configured to convert the first dynamic model to a second static model indicating a model of a second steady state of the plant, and to store the second static model into the first storage, the first steady state indicating a steady state of the plant temporally before the second steady state, a comparator configured to compare parameters included in the first static model with parameters included in the second static model and to output a comparison result, and a display configured to display the comparison results output from the comparator. The first database may store operating conditions and process values of process units included in the plant. The second database may store modification history information of the process units.

In the above-noted plant performance evaluation system, the plant performance evaluation apparatus may further include an operating condition equalizer configured to equalize the operating conditions of the first static model and the operating conditions of the second static model. The comparator may be configured to compare the first static model and the second static model which had been equalized by the operating condition equalizer.

In the above-noted plant performance evaluation system, the model converter may be configured to invalidate parameters with time dependence included in the first dynamic model to convert the first dynamic model to the second static model.

In the above-noted plant performance evaluation system, the first static model may be generated at the time the plant was designed.

A plant performance evaluation method according to an aspect of the present invention may include converting a first dynamic model indicating a model of a dynamic state of a plant to a first static model indicating a model of a first steady state in the plant, comparing parameters included in the first static model with parameters included in a second static model indicating a model of a second steady state in the plant and outputting a comparison result, the second steady state indicating a steady state of the plant temporally before the first steady state, and displaying the comparison result.

The above-noted plant performance evaluation method may further include equalizing the operating conditions of the first static model and the operating conditions of the second static model before the comparison of parameters. The comparison of parameters may include comparing the first static model and the second static model which had been equalized.

In the above-noted plant performance evaluation method, the conversion of the first dynamic model to the first static model may include invalidating parameters with time dependence included in the first dynamic model to convert the first dynamic model to the first static model.

In the above-noted plant performance evaluation method, the second static model may be generated at the time the plant was designed.

A plant performance evaluation apparatus, a plant performance evaluation system, and a plant performance evaluation method according to an aspect of the present invention can grasp the current states of process units in a plant and compare the current states of process units with the states at the time the plant was designed or past process unit states during operation. It can also provide information when considering plant maintenance or modification of equipment.

DETAILED DESCRIPTION OF THE INVENTION

Embodiments of a plant performance evaluation apparatus, a plant performance evaluation system, and a plant performance evaluation method according to the present invention will be described below, with references made to drawings.

First Embodiment

Figure 1:
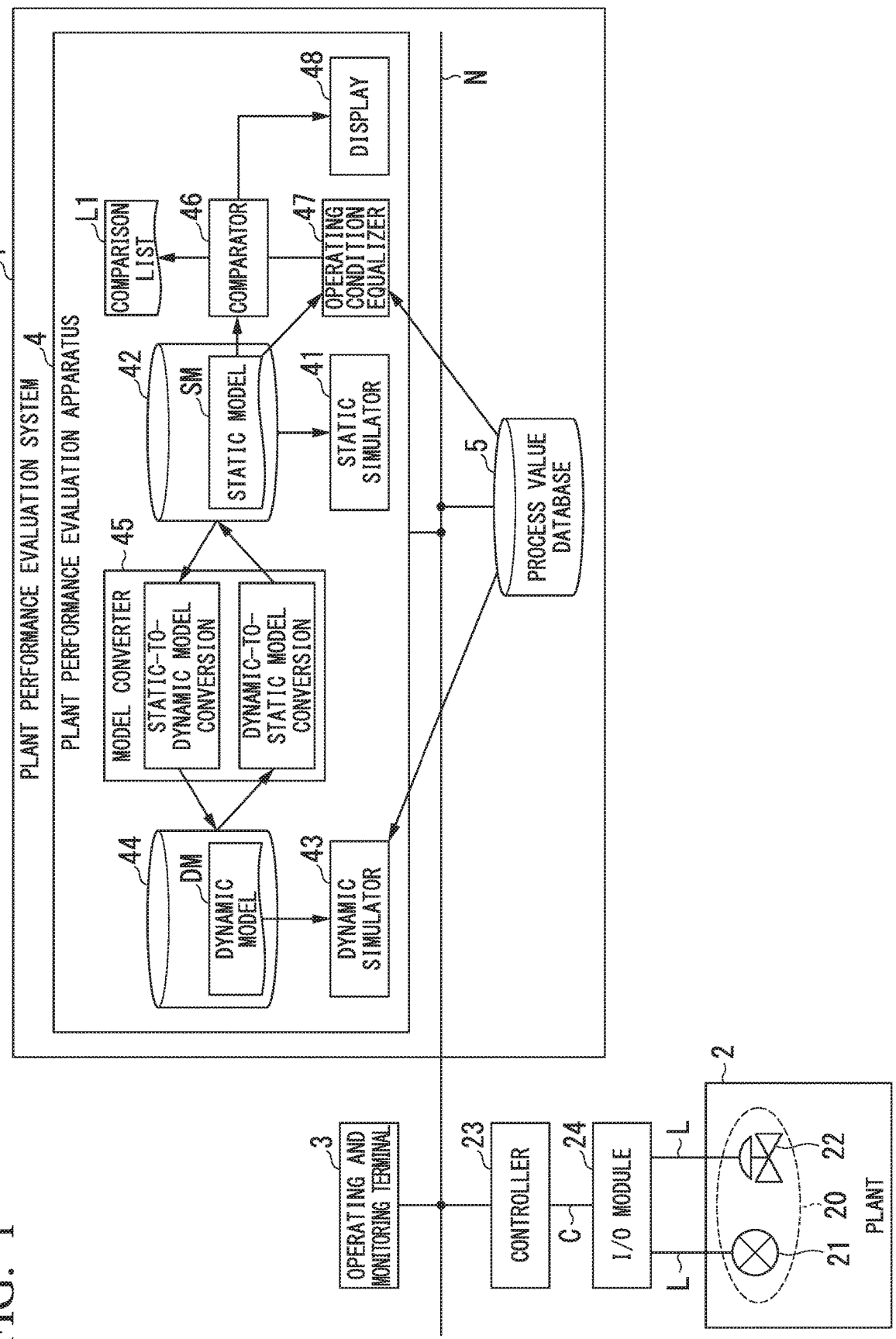
FIG. 1 is a block diagram showing an example of a plant performance evaluation system in a first embodiment.

FIG. 1 is a block diagram showing an example of a plant performance evaluation system in the first embodiment. The plant performance evaluation system 1 of the first embodiment makes a performance evaluation of each process unit constituting a plant 2, which is the evaluation target. The plant performance evaluation system 1 may include a plant performance evaluation apparatus 4 and a process value database 5 (first database), but is not restricted to these.

An operating and monitoring terminal 3, the plant performance evaluation apparatus 4, and the process value database 5 are connected to a network N. The plant 2 is connected to the network N via an I/O module 24 and a controller 23. The network N is, for example, a cable network such as an Ethernet (registered trademark), although it may be a wireless network capable of wireless communication conforming with a wireless communication standard, such as Wi-Fi (registered trademark), WiMAX (registered trademark), or 3G/LTE (registered trademark).

Figure 2:
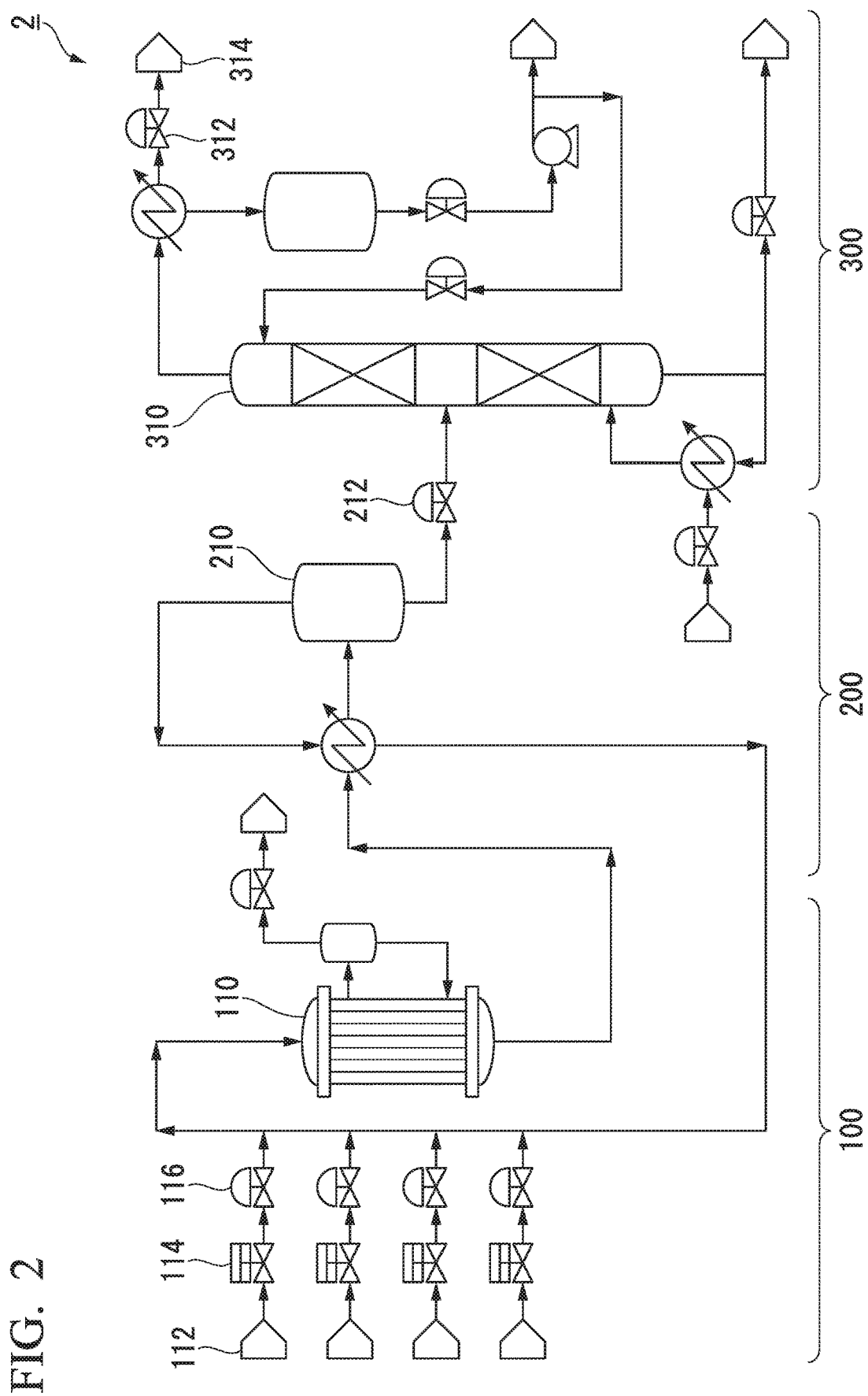
FIG. 2 shows an example of a plant in the first embodiment.

The plant 2 is, for example, in addition to an industrial plant such as a chemical plant, a plant that manages and controls the well head or the area there surrounding in a gas field or oil field, a plant that manages and controls electrical power generation such as thermoelectric, hydroelectric, or nuclear power, a plant that manages and controls environmental electric power generation such as from solar light or wind power, or a plant that manages and controls water and sewage or a dams. FIG. 2 shows an example of a plant in the first embodiment. The plant 2 shown in FIG. 2 is a chemical plant that has a plurality of process units (a reaction vessel unit 100, a vapor-liquid separator unit 200, and a distillation column unit 300). The reaction vessel unit 100 is supplied with the raw material of the product and a chemical reaction necessary for manufacturing the product is performed on the supplied raw material. The reaction vessel unit 100 is provided with, for example, a reaction vessel 110 in which the above-noted chemical reaction is made, a tank 112 that supplies the raw material, and also various field devices (for example, various types of valves 114 and 116, and various types of sensor devices (not shown)).

The vapor-liquid separator unit 200 is provided downstream from the reaction vessel unit 100 and separates the vapor and liquid components included in products obtained from the chemical reaction in the reaction vessel unit 100. The vapor-liquid separation unit 200 is provided with, in addition to a separator 210 that performs the above-noted processing to separate vapor and liquid, various field devices (for example various types of valves 212, and various types of sensor devices (not shown)). The distillation column unit 300 is provided downstream from the vapor-liquid separation unit 200 and, by vaporizing and then condensing the liquid components separated in the vapor-liquid separation unit 200, separates and condenses components included in the liquid components that have different boiling points. The distillation column unit 300 is provided with a distillation column 310 that performs the above-noted distillation processing, a tank 314 that stores the liquid components that have been distilled, and also various types of field devices (for example, various types of valves 312 and various types of sensor devices (not shown).

In FIG. 1, the plant 2 such as shown in FIG. 2 is simplified, and only the field devices 20 included within the process units are shown. The field devices 20 are connected to I/O ports (not shown) provided in the I/O module 24, via the transmission lines L. The transmission lines L include, for example, a transmission line used to transmit a 4 to 20 mA analog signal, a transmission line used to transmit a 0 to 1 kHz pulse signal, and a transmission line that transmits a high/low signal by switching contacts provided within the field device 20 on/off. A field device 20 transmits to the I/O module 24, via a transmission line L, a signal such as measured process value (for example flow amount or temperature). The field devices 20 may include measurement devices 21 such as flow gauges and temperature sensors and actuators 22 such as valve devices or actuator devices, but are not limited to these. Although FIG. 1 shows two field devices, three or more field devices may be provided in the plant 2.

The I/O module 24 is provided between the field devices 20 and the controller 23. A plurality of field devices 20 may be connected to the I/O module 24. The I/O module 24 processes of signals transmitted and received between the connected field devices 20 and the controller 23. For example, a signal received from a field device 20 (an analog signal such as a 4 to 20 mA signal and a digital signal superimposed on the analog signal) is processed to convert it to a signal that can be received by the controller 23. The I/O module 24 transmits the converted signal to the controller 23, via the cable C.

The controller 23, controls a field device 20 by performing process control communication with the field device 20, in accordance with instructions from the operating and monitoring terminal 3. For example, the controller 23 acquires a process value measured by a field device 20 (for example, a measurement device 21) and calculates and transmits an actuation amount of another field device 20 (for example, an actuator 22) so as to control the other field device 20 (for example, the actuator 22).

The operating and monitoring terminal 3 is, for example, operated by an operator of the plant and is used for monitoring a process. For example, the operating and monitoring terminal 3 acquires data from the controller 23 (for example, a process value) transmitted from a field device 20, indicates the behavior of the field device 20 and controller 23 to the operator, and controls the controller 23 based on instructions made by the operator.

The process value database 5 stores data transmitted from the field devices 20 or data transmitted to the field devices 20 (for example process values, actuation amounts, and operating conditions). For example, to evaluate the performance of the reaction vessel unit 100 of the plant 2 shown in FIG. 2, the process value database 5 stores the flow amount of the material input to the reaction vessel 110 provided in the reaction vessel unit 100, the flow amount of the product output from the reaction vessel 110, and other condition values and the like. The process value database 5 may be established in a memory provided in the controller 23. Alternatively, the process value database 5 may be established in a memory provided within the plant performance evaluation apparatus 4.

The plant performance evaluation apparatus 4 performs various types of processing used in the simulation model for performing a performance evaluation of the process units of the plant 2, which is the evaluation target. The simulation model is generated along the life cycle of the plant. The plant life cycle includes, for example, the design and construction phase in which the plant is designed and constructed and trial operation is done before the start of actual operation of the plant, the operation phase in which actual operation of the plant is done, and the equipment modification phase in which plant equipment is modified. Two types of models, a static model and a dynamic model, are used as simulation models. The static model and the dynamic model differ regarding the applications thereof, the target scope, and the information required for modeling.

The static model models each process unit of the plant in the steady state. The static model is generated at the time of designing the plant, based on, for example, a PFD (process flow diagram). The static model is expressed by simultaneous equations that express the relationship between input, output, external factors, and various parameters included in the process units that are the modeling targets. In the static model, in order to represent the steady-state operation of each process unit, a balance is established between input and output (the difference between input and output in the material balance, thermal balance, or the like being taken to be zero). The static simulator, which will be described later, simulates the steady-state of each process unit, and solves the above-noted equations, using this static model. In this static simulator, the emphasis is on grasping the process states, and modeling is done in units of process units, such as the reaction vessel unit, the vapor-liquid separation unit, and the distillation column unit. In this static model, field devices and the like are not modeled. For that reason, there are many cases in which other process units and field devices are not represented.

In contrast, the dynamic model models the dynamic (non-steady) state of the plant, taking into consideration the mutual relationships between process units. The dynamic model is expressed by simultaneous equations that express the relationship between input, output, external factors, and various parameters included in a plurality of process units within the plant. Because the dynamic model represents the dynamic state, there is no balance between input and output (the difference between input and output in the material balance, thermal balance or the like not being zero), and the model is constituted by parameters and equations such that the differences are integrated and differentiated with respect to time. The dynamic simulator, to be described later, performs the dynamic simulation of each process unit, and uses this dynamic model to obtain solutions to the above-noted equations (solving, for example, simultaneous differential equations). Modeling by a dynamic model requires process value information for each process unit and process value information accumulated from the past, before the modeling. The dynamic model is generated, for example, by a P&ID (piping & instrument diagram), and models the process units and field devices constituting the plant. In the dynamic model, modeling with mutual connections between the process units, thereby enabling simulation of the overall plant.

The plant performance evaluation apparatus 4 may include a static simulator 41, a static model storage 42 (first storage), a dynamic simulator 43, a dynamic model storage 44 (second storage), a model converter 45, a comparator 46, an operating condition equalizer 47, and a display 48, but is not limited to these. The static simulator 41, the dynamic simulator 43, the model converter 45, the comparator 46, and the operating condition equalizer 47 are implemented by a processor such as a CPU (central processing unit) executing a program stored in a program memory (not shown).

The static simulator 41, using the static model SM, simulates the steady state of the processes of the various process units constituting the plant 2. The static simulator 41, for example, evaluates the performance of each process unit by performing a simulation at the design and construction phase and the equipment modification phase of the plant 2. The results of these performance evaluations are used, for example, in considering the specifications of process units at the design and construction phase, and in considering capacity enhancement of processing units at the equipment modification phase.

The static model storage 42 stores the static model SM that models the steady state in units of process units. The static model storage 42 is, for example, an HDD (hard-disk drive), or an SSD (solid-state drive). The static model SM includes a static model SM (Ds) generated at the design and construction phase of the plant 2, and a static model SM (Op) generated at the operating phase of the plant 2. The static model DM (Ds), for example, is generated based on the PFD of the plant 2. The static simulator 41 performs a production result forecast of the plant, using the static model SM (Ds) stored in the static model storage 42. The static model SM (Op) is generated using the dynamic model DM, using the model converter 45, which will be described later.

The dynamic simulator 43 performs a simulation of the plant 2, which is the simulation target, giving consideration to the mutual relationships between the process units, using the dynamic model DM. The dynamic simulator 43 is used, for example, to simulate the operation of the process units by performing a simulation in the operating phase of the plant 2. The process values and the like stored in the process value database 5 are used at the time of generating the dynamic simulator 43 and the dynamic model DM.

The dynamic model storage 44 stores the dynamic model DM that models the dynamic state of the plant, giving consideration given to the mutual relationships between the process units. The dynamic model storage 44 is, for example, an HDD or SSD. The dynamic model DM includes a dynamic model DM (Ds) generated at the design and construction phase of the plant 2, and a dynamic model DM (Op) generated at the operating phase of the plant 2. The dynamic model DM (Ds), for example, is generated at the design and construction phase of the plant 2, by converting the static model SM (Ds) to the dynamic model DM (Ds) by the model converter 45, to be described later, and then making additional definitions of dynamic information. The dynamic model DM (Op), for example, is generated by the dynamic simulator 43 tuning (adjusting) the parameters included in the dynamic model DM (Ds), based on the operating state of the plant 2.

The model converter 45 converts the dynamic model DM to the static model SM. For example, the model converter 45, in the operating phase of the plant 2, converts the dynamic model DM (Op) to the static model SM (Op). The model converter 45 may convert the static model SM to the dynamic model DM. For example, the model converter 45, in the design and construction phase of the plant 2, may convert the static model SM (Ds) to the dynamic model DM (Ds).

The comparator 46 reads out the static model SM (Ds) from the static model storage 42, receives the equalized static model SM (Op) from the operating condition equalizer 47, compares the parameters included in the static model SM (Ds) with the parameters included in the static model SM (Op), and generates a comparison list L1 of the comparison results. The comparator 46 may generate a comparison list L1 that extracts only the parameters for which a difference has occurred.

The operating condition equalizer 47 reads from the process value database 5 the operating conditions that were expected at the time of generation of the static model SM (Ds) at the design and construction phase of the plant 2 and the operating conditions at the time of generation of the static model SM (Op) at the operating phase of the plant 2, and causes the operating conditions in the static model SM (Ds) and the static model SM (Op) to coincide. By causing the operating conditions to coincide, the static model SM (Ds) and the static model SM (Op) can be compared. If the model converter 45 is provided, for example, with a function of equalizing the operating conditions, the operating condition equalizer 47 need not be provided.

The display 48 displays the comparison list L1 output by the comparator 46. The display 48 is, for example, a liquid-crystal display or an organic EL (electroluminescence display device).

(Plant Performance Evaluation Apparatus Operation)

Figure 3:
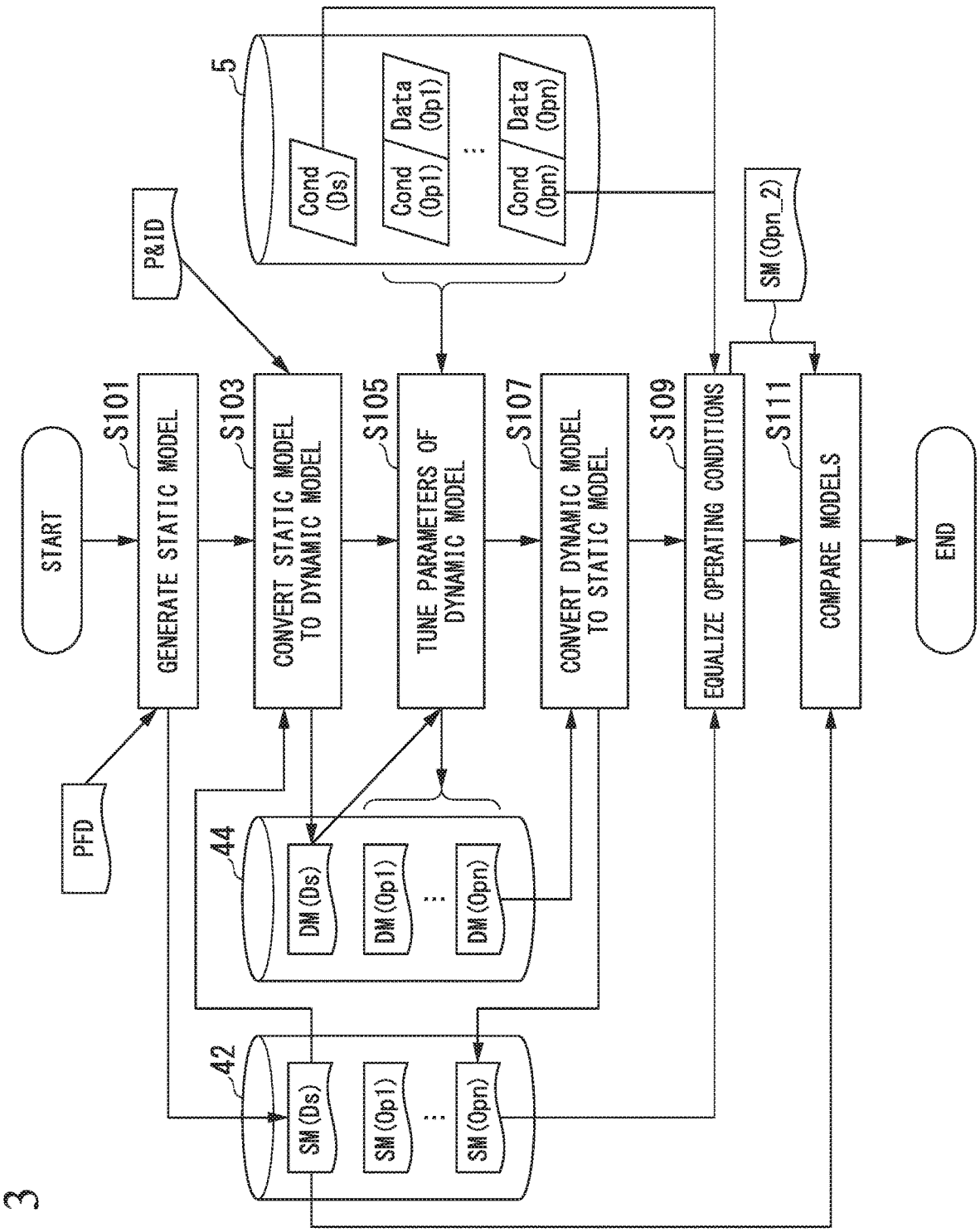
FIG. 3 is a flowchart showing an example of the flow of processing in a plant performance evaluation apparatus in the first embodiment.

Next, the operation of the plant performance evaluation apparatus 4 of the first embodiment will be described. FIG. 3 is a flowchart showing an example of the flow of processing in the plant performance evaluation apparatus 4 in the first embodiment. This flowchart illustrates the static model storage 42 and the dynamic model storage 44 that store the models which are generated and read in at each step, and also the process value database 5 that stores the operating conditions and process values and the like.

In the design and construction phase, for example, a process engineer generates a static model SM (Ds) (first static model), based on a PFD or the like, and it is stored into the static model storage 42 (step S101). The static model SM (Ds) indicates the steady state (first steady state) expected at the time of designing the plant 2. When the static model SM (Ds) is stored into the static model storage 42, the operating conditions (including environmental conditions) Cond (Ds) expected at the time of generation of the static model SM (Ds) are stored into the process value database 5.

Next, at the design and construction phase, the model converter 45 reads out the static model SM (Ds) from the static model storage 42, additionally defines dynamic information after having converted the static model SM (Ds) to the dynamic model DM (Ds) (first dynamic model), and stores this into the dynamic model storage 44 (step S103). For example, the model converter 45 uses parameters and balance data obtained from a P&ID and the static model SM (Ds) to generate the dynamic model DM (Ds). Rather than the model converter 45 converting the static model SM (Ds) to the dynamic model DM (Ds), the dynamic model DM (Ds) may be generated, for example, manually by a process engineer.

Next, in the operating phase, the parameters of the dynamic model DM (Ds) are tuned so that the calculation results of the dynamic simulator 43 approach the actual plant state (step S105). For example, the current operating conditions and process values, such as Cond (Op1) and Data (Op1), are read out from the process value database 5. Next, the simulation results using the dynamic model DM (Ds) and the read-out Cond (Op1) and Data(Op1) are compared, so as to tune the parameters of the dynamic model DM (Ds) in accordance with the comparison results, thereby generating the dynamic model DM (Op1). For example, the parameters of the dynamic model DM (Ds) may be tuned as described in Katsumi YOKOYAMA et al, "Visual Modeler Dynamic Simulator Added with Steady State Simulation Function", Yokogawa Technical Report. Vol. 52, No. 1 (2008).

Next, in the operating phase, the model converter 45 reads out from the dynamic model storage 44 the dynamic model DM (Op1), the parameters of which have been tuned based on the current plant state, and converts the dynamic model DM (Op1) to the static model SM (Op1) (second static model) (Step S107). For example, the model converter 45 removes the unnecessary device information and accumulated information along the time axis included in the dynamic model DM (Op1) and makes the input-to-output difference of the modeling target zero, so as to generate the static model SM (Op1) from the dynamic model DM (Op1). The steady state (first steady state) indicated by the above-noted static model SM (Ds) indicates the steady state of the plant 2 temporally before the steady state (second steady state) indicated by the static model SM (Op1). The processing to convert the dynamic model DM (Op1) to the static model SM (Op1) will be described later.

Thereafter, in accordance with the actual plant state (in accordance with the Cond (Op2) to (Opn) and Data (Op2) to (Opn) newly stored into the process value database 5) the parameters of the dynamic model DM are tuned (step S105) and the static model SM is generated (step S107), these steps being repeated, so as to generate the dynamic models DM (Op2) to DM (Opn) and the static models SM (Op2) to SM (Opn) (where n is a positive integer). These dynamic models DM (Op1) to DM (Opn) are stored into the dynamic model storage 44, and the static models SM (Op1) to SM (Opn) are stored into the static model storage 42.

Next, in the design and construction phase, the operating condition equalizer 47 reads out the static model SM (Opn) stored in the static model storage 42 and the operating conditions Cond (Ds) and Cond (Opn) stored in the process value database 5, and causes the operating conditions of the static model SM (Opn) to coincide with the operating conditions Cond (Ds) of the static model SM (Ds) at the time of design (step S109). The static model SM (Opn) in which the operating conditions have been adjusted will be called the static model SM (Opn_2). By causing the operating conditions to coincide, the static model SM (Ds) and the static model SM (Opn) can be compared. The processing to cause the operating conditions of the static model SM (Ds) and the static model SM (Opn) to coincide will be described later. If another equalization processing, such as processing performed to equalize the operating conditions in the conversion processing at the above-noted step S107, is not necessary, this step S109 need not be executed.

Next, at the equipment modification phase, the comparator 46 reads out the static model SM (Ds) stored in the static model storage 42 and compares the parameters included in the static model SM (Ds) with the parameters included in the static model SM (Opn_2) which had been equalized by the operating condition equalizer 47, generates a comparison list L1 of the comparison results, and ends the processing of this flowchart (step S111). For example, the comparator 46 may generate a comparison list L1 that extracts only parameters for which a difference has occurred. The comparison list L1 may be displayed by the display 48.

Figures 4, 5:
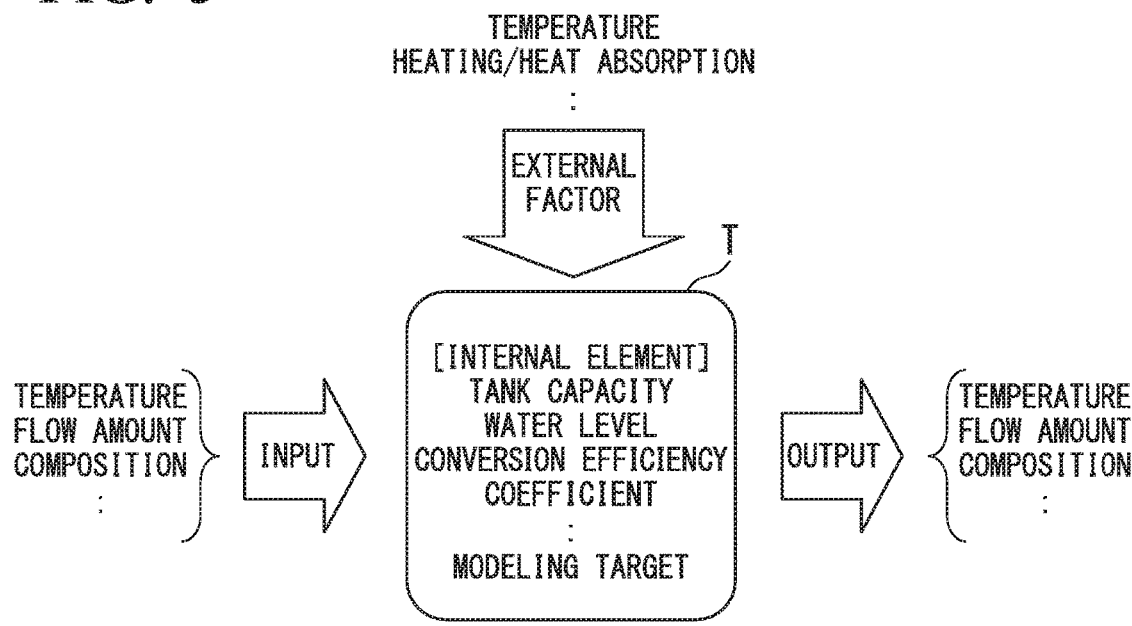
FIG. 4 shows an example of a comparison list in the first embodiment.
FIG. 5 shows an example of the relationship between the input, output, external factors, and internal factors with respect to the modeling target in the first embodiment.

The comparison list L1 shown in FIG. 4 is a list that extracts only parameters for which a difference has occurred. In this comparison list L1, for example, shows the overall heat transfer coefficient U of the heat exchanger parameter EA101. It can be seen that whereas this "EA101 overall heat transfer coefficient U" parameter was 600 at the time of design, it is currently 500, indicating a change in the parameter. Because there are several hundred or several thousand parameters included in the static model SM (Ds) and the static model SM (Opn), by extracting only parameters for which a difference has occurred as shown above, and evaluating the comparison information between the designed performance and the current performance, it is possible, for example, to easily identify bottlenecks.

(Processing for Conversion from a Dynamic Model to a Static Model)

FIG. 5 shows an example of the relationship between the input, output, external factors, and internal elements with respect to the modeling target in the first embodiment. In FIG. 5, input having parameters such as temperature, flow amount, and composition is made with respect to the modeling target T, and output is obtained of the change in parameters such as temperature, flow amount, and composition, via the modeling target T. The modeling target T itself has parameters such as tank capacity, water level, and conversion efficiency coefficient, and there are also parameters of external factors (air temperature, heating, heat absorption) applied to the modeling target T. Each parameter is often affected by other parameters and changes, so that there are a plurality of equations that indicate the mutual relationships therebetween. The simulation is the solving of these simultaneous equations. Although FIG. 5 shows the example of one input and one output, there may be a plurality of inputs and a plurality of outputs.

In the simulator, it is possible to select which parameters are the knowns and which parameters are to be derived. For example, if the external factors and internal elements are known parameters, with the known parameters applied, how the resulting output parameters will change can be calculated. With the input, output, and external factors and the like as the known parameters, the parameters of internal elements can be derived. The static simulator 41 calculates the parameter values in the steady state (the state in which there is no change with time). Therefore, the equations and parameters of the static model SM which is that model to not include functions of time. Because it is necessary to fix the input and output in order to derive internal element parameters, it is not easy for the static simulator 41, for example, to perform a simulation in a condition in which a plurality of process units (modeling targets) are continuously connected as shown in FIG. 2.

In the dynamic simulator 43, it is possible to include equations that are dependent on time (for example, time differential equations) in the simultaneous equations. Time dependence of a parameter, for example, indicates that the water level, which is an internal element parameter, increases (or decreases) with time. Because a simulation calculation can be done even under conditions with which the input and output with respect to each process unit varies with time, it is possible, for example, to perform a simulation calculation in a state in which a plurality of process units are continuously connected, such as shown in FIG. 2. The model converter 45 of the present embodiment performs the following model conversion, based on the characteristics of the static simulator 41 and the dynamic simulator 43 as noted above. The conversion from the dynamic model DM to the static model SM may be done in any way. For example, a process engineer may convert the dynamic model DM to the static model SM manually, or another method may be used to convert the dynamic model DM to the static model SM automatically.

Figure 6:
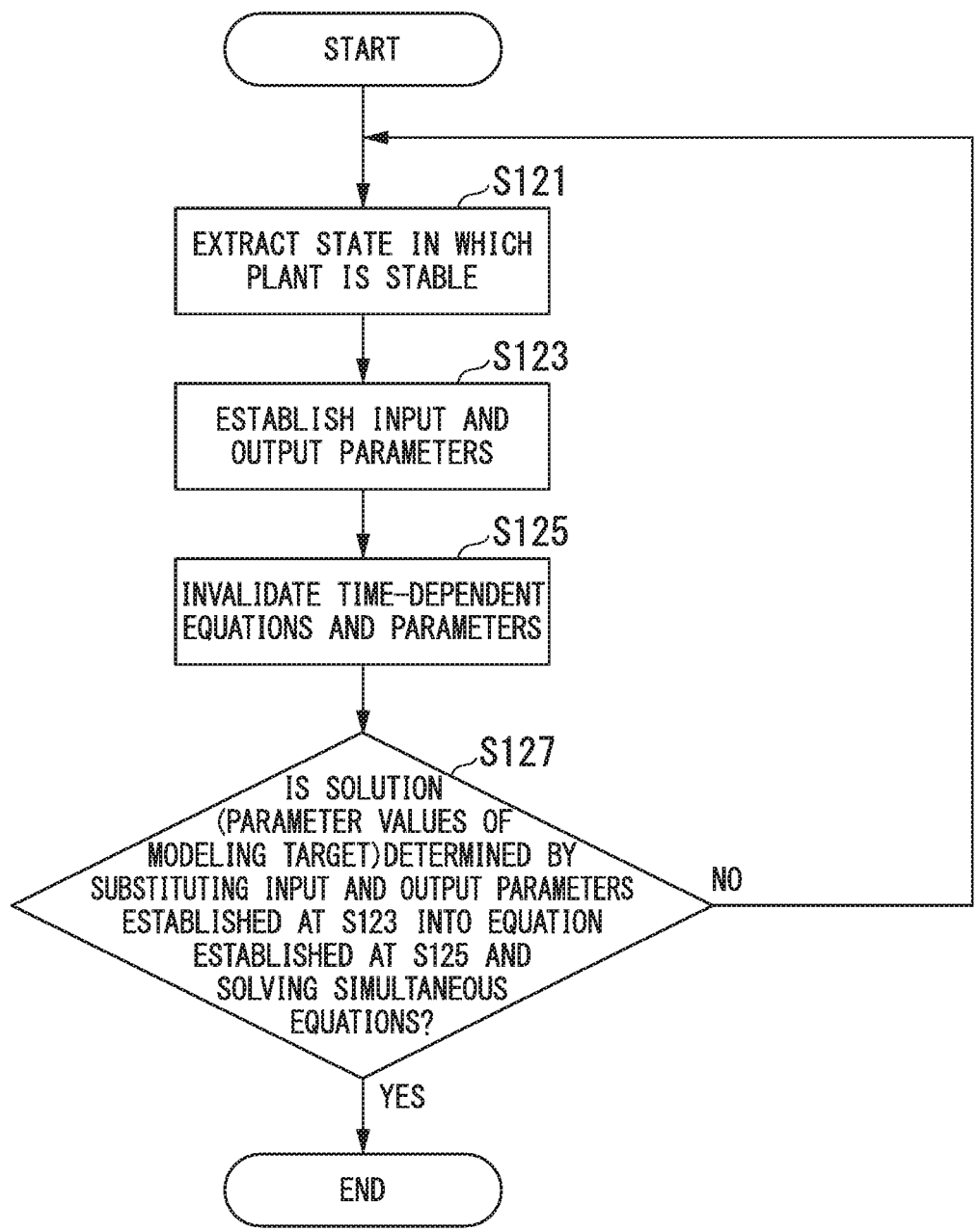
FIG. 6 is a flowchart showing an example of the processing to convert a dynamic model to a static model in the first embodiment.

FIG. 6 is a flowchart showing an example of the processing to convert the dynamic model DM (Opn) to the static model SM (Opn). First, the state in which the plant 2 is stable is extracted (step S121). That is, the state in which the input and output change of the modeling target is small is extracted. For example, the process values in the process value database 5 are referenced, and the state in which the time variations are small is extracted. This extraction processing may be done manually by a process engineer, or a threshold provided beforehand with respect to a prescribed process value and the state in which the plant performance evaluation apparatus 4 is stable may be automatically extracted. Selecting state in which the plant 2 is as stable as possible facilitates the establishment of a balance between input and output parameters of the static model SM (Opn).

Next, the model converter 45 establishes the input and output parameters of the target process unit for which the static model SM (Opn) is to be generated (step S123).

Next, in the dynamic model DM (Opn), the model converter 45 invalidates (by removal or making constant) equations having unnecessary dynamic variations and parameters in the static model SM (Opn) (step S125). The model converter 45 generates the static model SM (Opn), with the input/output difference of the target process unit as zero.

Next, the input and output parameters established at step S123 are substituted into the static model SM (Opn) generated at step S125, and the solutions to the simultaneous equations (parameter values of the modeling target) are determined (step S127). If the solutions are determined, the processing of this flowchart is ended.

If, however, the solutions cannot be determined at step S127, return is made to step S121, the extraction of the stable plant state is redone, and if the solution can be determined at step S127, the processing of this flowchart is ended.

(Operating Condition Equalization)

Figure 7:
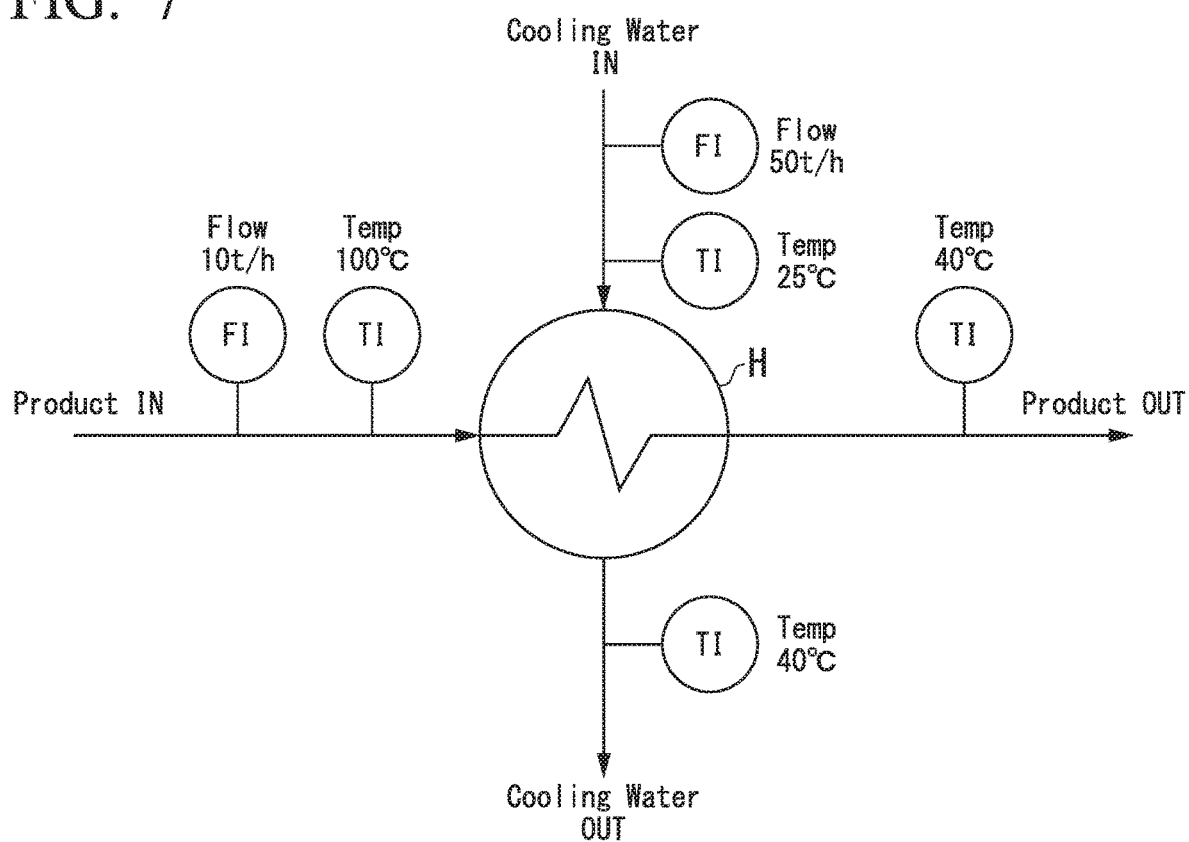
FIG. 7 shows an example of a heat exchanger that is the modeling target in the first embodiment.

FIG. 7 shows an example of a heat exchanger that is a modeling target. The horizontal axis represents the flow of products that are produced by the plant, and the vertical axis represents the flow of cooling water. In this case, for a heat exchanger H in which the supposed designed values are cooling water at a temperature of 25° C. flowing at a rate of 50 t/h, what is shown is that, after product at a temperature of 100° C. flows at a rate of 10 t/h, the product temperature is 40° C. after passing through the heat exchanger H.

In general, the overall heat transfer coefficient of a heat exchanger can be expressed as shown in Equation (1). As a simplification, the assumption is made that there is no leakage of product and cooling water from the heat exchanger H and that there is no deterioration in the cooling water system.

$$U = U_{des} \times f(F/F_{des}) \qquad \text{Equation (1)}$$

In the above:

U is the overall heat transfer coefficient of the heat exchanger H (W/m²K), $U_{des}$ is the overall heat transfer coefficient of the heat exchanger H at the time of design (W/m²K), F is the product flow rate (kg/h), $F_{des}$ is the designed flow rate (kg/h), and f(F) is a function of product flow rate (kg/h).

Considering the heat exchanger H shown in FIG. 7 along with the equation (1), the designed state is given by the following Equation (1').

$$U = U_{des} \times f(10000/10000) \qquad \text{Equation (1')}$$

Next, the product flow rate and temperature of the actual plant are taken to be as follows.

Heat exchanger H input port: Flow rate of 15 t/h and temperature of 100° C.

Heat exchanger H output port: Flow rate of 15 t/h and temperature of 50° C.

Under these conditions, if the overall heat transfer coefficient of the heat exchanger H estimated from actually measured values is $U_{real}$, the flow conditions at the input port of the heat exchanger H differs from the time of design, it is necessary to make the conditions the same, as shown in Equation (2).

$$U_{real} = U_{des}' \times f(15000/10000) \qquad \text{Equation (2)}$$

If the input/output temperature difference by the result of the static simulation in which the operating conditions were equalized using the $U_{des}'$ calculated from the above-noted Equation (2) is the same as at the time of design, it can be said that no change has occurred in the $U_{des}$. If, however, the input/output temperature difference by the result of the static simulation using $U_{des}'$ is different from the input/output temperature at the time of design, the following judgments can be made.

(1) If input/output temperature difference when operating is smaller than input/output temperature difference at the time of design, the capacity of the heat exchanger H is lower than expected in the design.

(2) If input/output temperature difference when operating is larger than input/output temperature difference at the time of design, the capacity of the heat exchanger H is higher than expected in the design.

By performing calculations as shown above, the operating condition equalizer 47 calculates a static model SM (Opn_2), in which the operating conditions have been made to coincide with those of the static model SM (Ds). By obtaining the static model SM (Ds) at the time of design and the static model SM (Opn_2) with equalized operating conditions, a highly accurate comparison can be done between the static model SM (Ds) and the static model SM (Opn_2).

According to the first embodiment described above, a static model SM (Opn) can be obtained from a dynamic model DM (Opn) that models a plant. By comparing the static model SM (Opn) obtained by conversion of the dynamic model DM (Opn) with the static model SM (Ds) at the time of design, it is possible to grasp the degree of change in the state of the plant from the time of design. It is also possible to consider equipment modification of the overall plant, with consideration given to the mutual relationship between the process units.

Although in the above, the description has been for an example in which one static model SM is generated from one dynamic model DM, if a plurality of process units are included within the dynamic model DM, the above-noted conversion of the dynamic model DM to the static model SM can be done by arbitrary process units. By performing this conversion processing for each process unit individually, it is possible to derive a plurality of static models SM from one dynamic model DM.

Second Embodiment

Next, the second embodiment of the present invention will be described. Compared with the first embodiment, in the plant performance evaluation system of the second embodiment, the details of the operating condition equalization performed by the operating condition equalizer 47 are different. For that reason, in the description of the second embodiment, the same reference symbols are applied to parts that are the same as in the first embodiment, and the descriptions thereof will be omitted or simplified.

(Plant Performance Evaluation Apparatus Operation)

Figure 8:
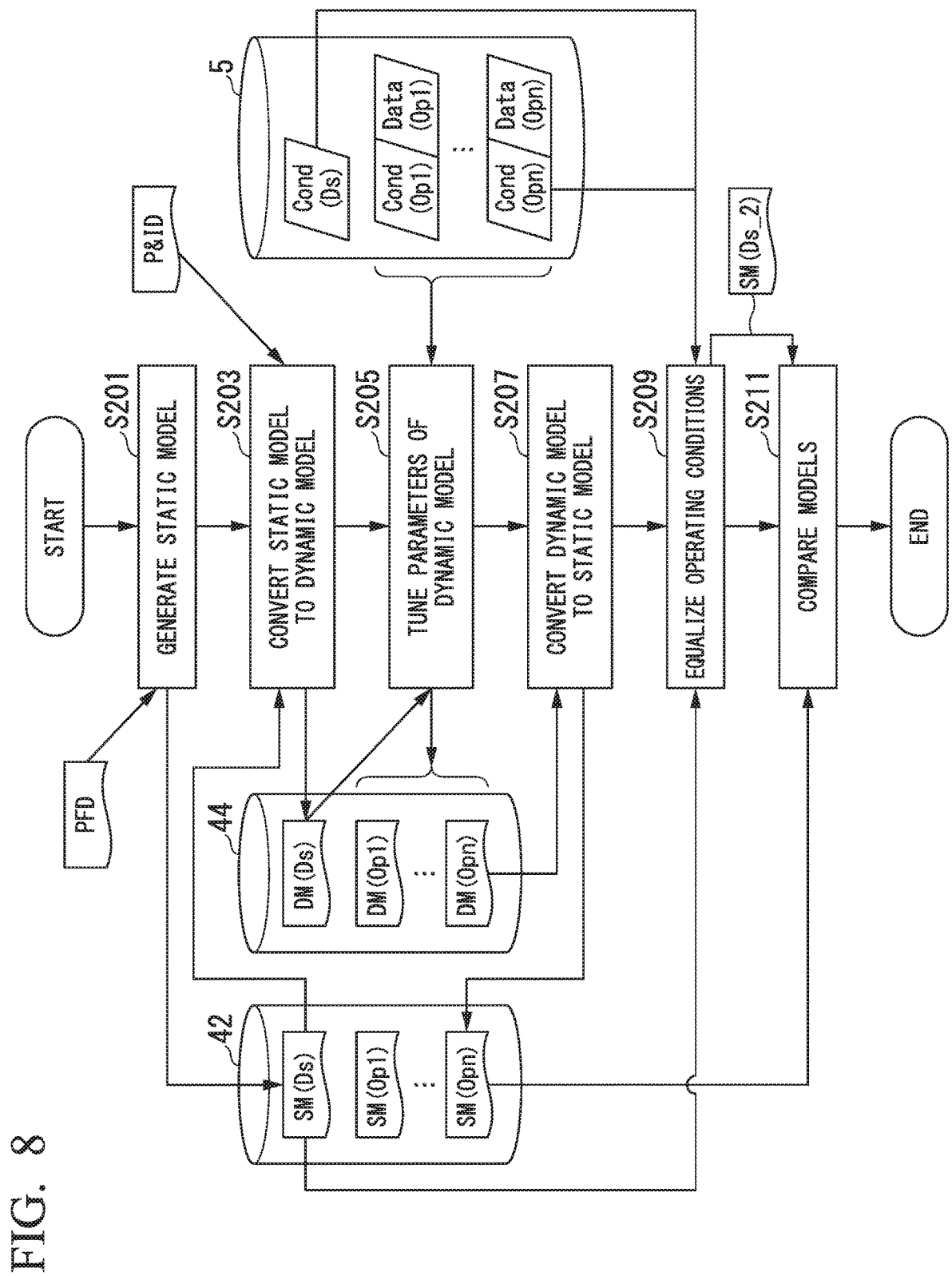
FIG. 8 is a flowchart showing an example of the flow of processing in a plant performance evaluation apparatus of a second embodiment.

The operation of the plant performance evaluation apparatus 4 of the second embodiment will now be described. FIG. 8 is a flowchart showing an example of the flow of processing in the plant performance evaluation apparatus 4 in the second embodiment.

In the design and construction phase, for example, a process engineer generates a static model SM (Ds), based on a PFD or the like and stores into the static model storage 42 (step S201).

Next, at the design and construction phase, the model converter 45 reads out the static model SM (Ds) from the static model storage 42, additionally defines dynamic information after having converted the static model SM (Ds) to the dynamic model DM (Ds), and stores this into the dynamic model storage 44 (step S203).

Next, in the operating phase, the parameters of the dynamic model DM (Ds) are tuned so that the calculation results of the dynamic simulator 43 approach the actual plant state (step S205). For example, the current operating conditions and process values, such as Cond (Op1) and Data (Op1), are read out from the process value database 5. Next, the simulation results using the dynamic model DM (Ds) and the read-out Cond (Op1) and Data (Op1) are compared so as to tune the parameters of the dynamic model DM (Ds), thereby generating the dynamic model DM (Op1).

Next, in the operating phase, the model converter 45 reads out from the dynamic model storage 44 the dynamic model DM (Op1), the parameters of which have been tuned based on the current plant state, and converts the dynamic model DM (Op1) to the static model SM (Op1) (Step S207).

Thereafter, in accordance with the actual plant state, the parameters of the dynamic model DM are tuned (step S205) and the static model SM is generated (step S207), these steps being repeated, so as to generate the dynamic models DM (Op2) to DM (Opn) and the static models SM (Op2) to SM (Opn) (where n is a positive integer). The dynamic models DM (Op1) to DM (Opn) are stored into the dynamic model storage 44, and the static models SM (Op1) to SM (Opn) are stored into the static model storage 42.

Next, in the design and construction phase, the operating condition equalizer 47 reads out the static model SM (Ds) stored in the static model storage 42 and the operating conditions Cond (Ds) and Cond (Opn) stored in the process value database 5, and causes the operating conditions of the static model SM (Ds) to coincide with the operating conditions Cond (Ops) of the static model SM (Opn) at the time of the generation of the static model SM (Opn) (step S209). The static model SM (Ds) in which the operating conditions have been adjusted will be called the static model SM (Ds_2). If another equalization processing, such as processing performed to equalize the operating conditions in the conversion processing at the above-noted step S207, is not necessary, this step S209 need not be executed.

Next, at the equipment modification phase, the comparator 46 reads out the static model SM (Ds) stored in the static model storage 42 and compares the parameters included in the static model SM (Opn) with the parameters included in the static model SM (Ds_2) which had been equalized by the operating condition equalizer 47, generates a comparison list L1 of the comparison results, and ends the processing of this flowchart (step S211). The comparator 46 may generate a comparison list L1 that extracts only parameters for which a difference has occurred.

According to the second embodiment described above, by making the operating conditions of the static model SM (Ds) at the time of design of the plant 2 coincide with the operating conditions of the static model SM (Opn) generated when the plant 2 is operating and by comparing both, it is possible to investigate equipment modification of the plant, giving consideration to the mutual relationship between the process units. Also it is possible to perform modeling with mutual connections between the process units, thereby enabling investigation of equipment modifications in the overall plant.

Third Embodiment

Next, the third embodiment of the present invention will be described. The difference of the plant performance evaluation system of the third embodiment from the first embodiment is that, instead of the dynamic simulator 43, it is provided with a plant performance evaluation apparatus 4A having a tracking simulator 49. For that reason, in the description of the third embodiment, the same reference symbols are applied to parts that are the same as in the first embodiment, and the descriptions thereof will be omitted or simplified.

Figure 9:
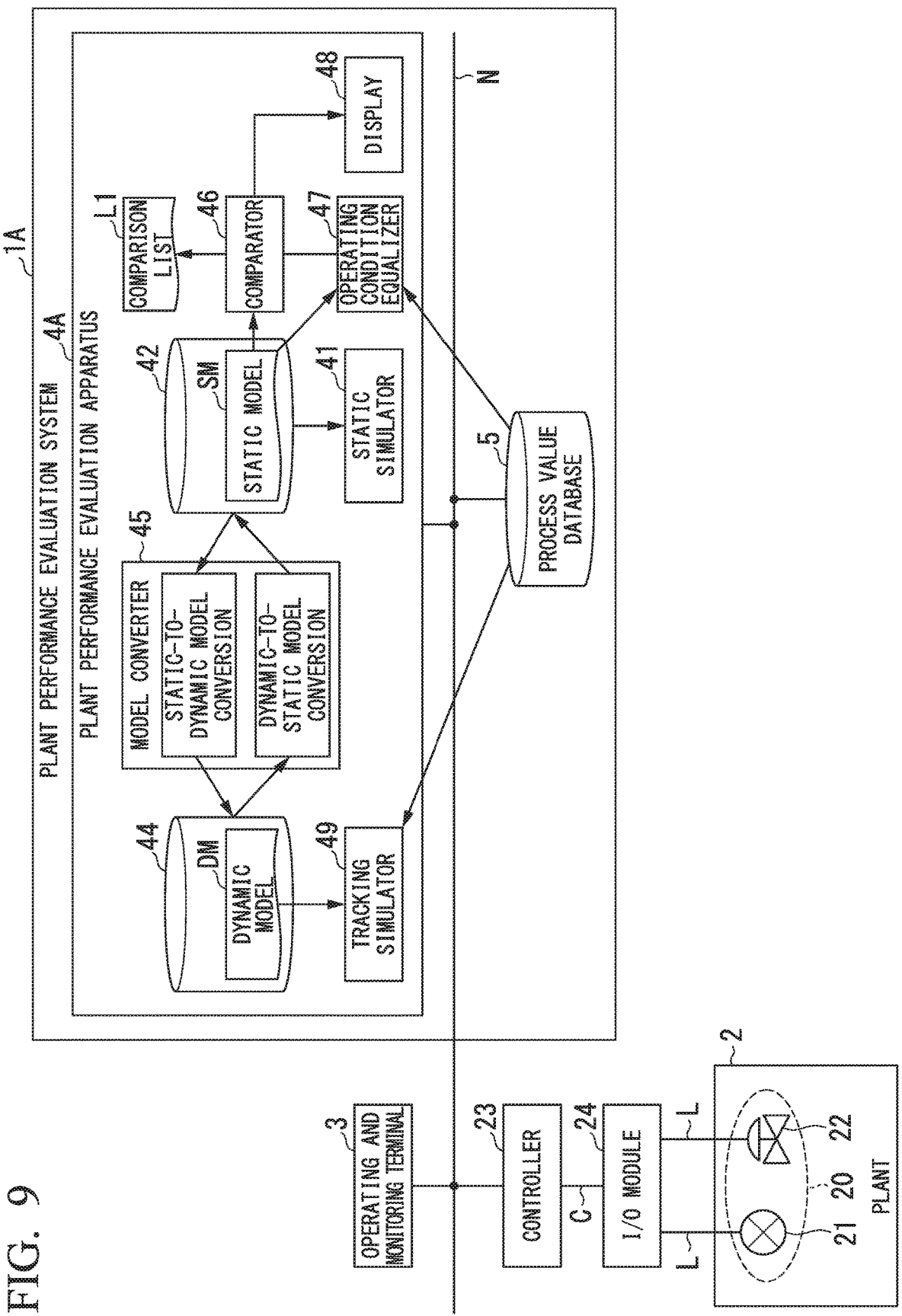
FIG. 9 is a block diagram showing an example of a plant performance evaluation system in a third embodiment.

FIG. 9 is a block diagram showing an example of a plant performance evaluation system in the third embodiment. The plant performance evaluation system 1A of the third embodiment has the plant performance evaluation apparatus 4A having the tracking simulator 49 in place of the dynamic simulator 43 of the first embodiment.

The tracking simulator 49 can track the actual plant online in real time, and faithfully simulate the plant state. Because the tracking simulator 49 uses a strict model based on chemical engineering, it can calculate not only superficial actions such as inputs and outputs with respect to processes, but also the fine internal process states. For that reason, deterioration, for example, within the actual plant is reflected in the simulation parameters. Specifically, the tracking simulator 49, in addition to have the function of the dynamic simulator 43 of reading out various data such as process values from the process value database 5 and simulating the actual operating state of the plant 2, has a function of comparing the simulation results and the actual data such as process values, so as to adjust the dynamic model DM to match the operation of the plant 2. The simulators described in Japanese Patent No. 5696385, Japanese Patent No. 4789277, and Tatenobu SEKI et al, "Innovative Plant Operations by Using Tracking Simulators" Yokogawa Technical Report. Vol. 52, No. 1 (2008) may be used as the tracking simulator 49.

(Plant Performance Evaluation Apparatus Operation)

Figure 10:
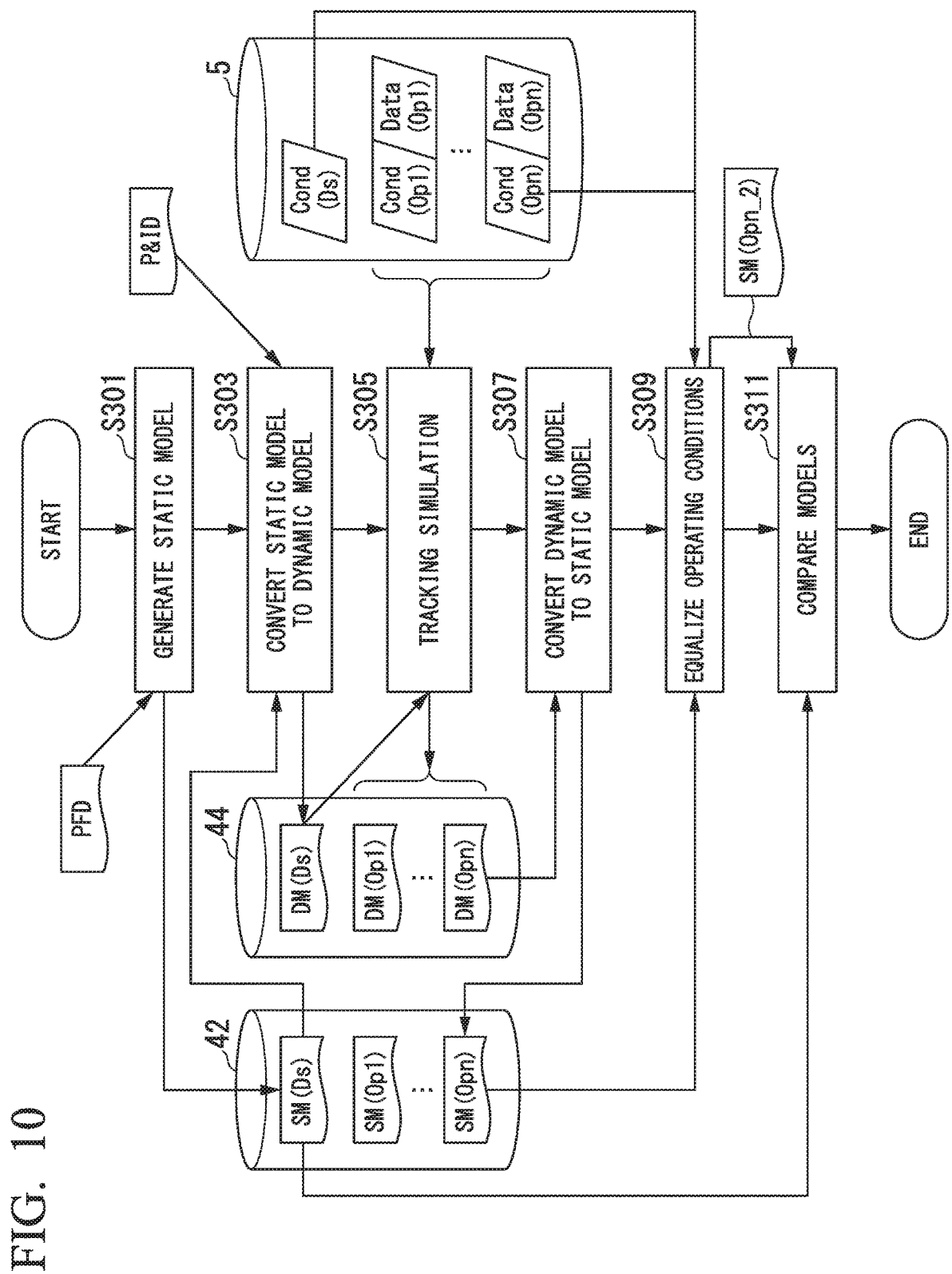
FIG. 10 is a flowchart showing an example of the flow of processing in a plant performance evaluation apparatus of the third embodiment.

Next, the operation of the plant performance evaluation apparatus 4A of the third embodiment will be described. FIG. 10 is a flowchart showing an example of the flow of processing in the plant performance evaluation apparatus 4A in the third embodiment.

In the design and construction phase, for example, a process engineer generates a static model SM (Ds) based on a PFD or the like and stores into the static model storage 42 (step S301).

Next, at the design and construction phase, the model converter 45 reads out the static model SM (Ds) from the static model storage 42, additionally defines dynamic information after having converted the static model SM (Ds) to the dynamic model DM (Ds), and stores this into the dynamic model storage 44 (step S303).

Next, in the operating phase, the tracking simulator 49 tunes the parameters of the dynamic model DM (Ds) so that the calculation results of the tracking simulator 49 approach the actual plant state (step S305). For example, the tracking simulator 49 reads out Cond (Op1) and Data (Op1), compares the simulation results using the dynamic model DM (Ds) with the read-out Cond (Op1) and Data(Op1), and tunes the parameters of the dynamic model DM (Ds), so as to generate the dynamic model DM (Op1).

Next, in the operating phase, the model converter 45 reads out from the dynamic model storage 44 the dynamic model DM (Op1) the parameters of which have been tuned based on the current plant state, and converts the dynamic model DM (Op1) to the static model SM (Op1) (Step S307).

Thereafter, in accordance with the actual plant state, the parameters of the dynamic model DM are tuned (step S305) and the static model SM is generated (step S307), these steps being repeated, so as to generate the dynamic models DM (Op2) to DM (Opn) and the static models SM (Op2) to SM (Opn) (where n is a positive integer). The dynamic models DM (Op1) to DM (Opn) are stored into the dynamic model storage 44, and the static models SM (Op1) to SM (Opn) are stored into the static model storage 42.

Next, in the design and construction phase, the operating condition equalizer 47 reads out the static model SM (Opn) stored in the static model storage 42 and the operating conditions Cond (Ds) and Cond (Opn) stored in the process value database 5, and causes the operating conditions of the static model SM (Opn) to coincide with the operating conditions Cond (Ds) of the static model SM (Ds) at the time of the generation of the static model SM (Ds) (step S309). The static model SM (Opn) in which the operating conditions have been adjusted will be called the static model SM (Opn_2). If another equalization processing, such as processing performed to equalize the operating conditions in the conversion processing at the above-noted step S307, is not necessary, this step S309 need not be executed.

Next, at the equipment modification phase, the comparator 46 reads out the static model SM (Ds) stored in the static model storage 42 and compares the parameters included in the static model SM (Ds) with the parameters included in the static model SM (Opn_2) which had been equalized by the operating condition equalizer 47, generates a comparison list L1 of the comparison results, and ends the processing of this flowchart (step S311). The comparator 46 may generate a comparison list L1 that extracts only parameters for which a difference has occurred.

According to the third embodiment described above, a tracking simulator 49 that automatically generates the dynamic model DM (Opn) that reproduces in detail the current plant state by each process unit is provided, and this dynamic model DM (Opn) is converted into the static model SM (Opn), thereby enabling a substantially real-time comparison of the plant state at the current time and the plant state at the time of design.

Figure 11:
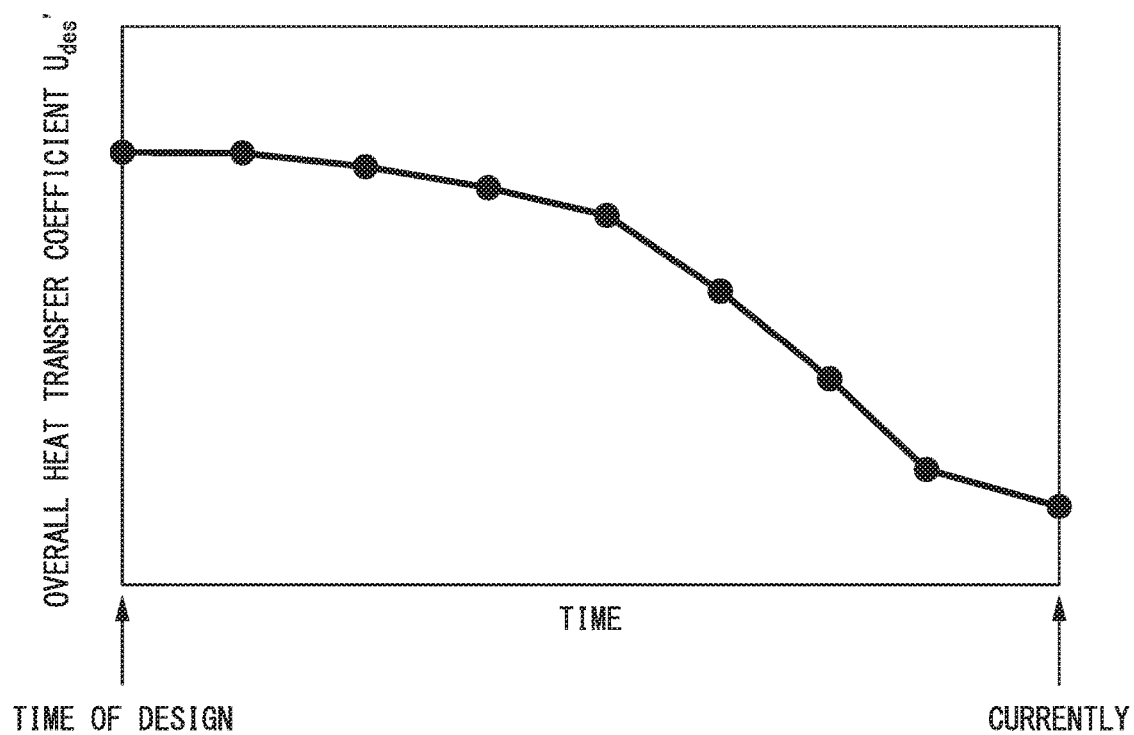
FIG. 11 is a graph showing an example of the change with aging of the overall heat transfer coefficient $U_{des}'$ during operation of the heat exchanger shown in FIG. 7 in the third embodiment.

In the foregoing, although the description has been for the example of which, in the equipment modification phase, the static model SM (Opn) that reproduced in detail the current state of the plant for each process unit individually and the static model SM (Ds), in order to investigate the deterioration of process units with the passage of time in the operating phase, the processing results of the tracking simulator 49 using the value, after equalization by the operating condition equalizer 47, may be used to make a comparison of time-sequence changes. For example, FIG. 11 is a graph showing an example of the change with aging of the overall heat transfer coefficient $U_{des}'$ during operation of the heat exchanger H shown in FIG. 7. From the graph shown in FIG. 11, it is possible to grasp visually that the value of the overall heat transfer coefficient $U_{des}'$ decreases with the passage of time from the time of design.

Figure 12:
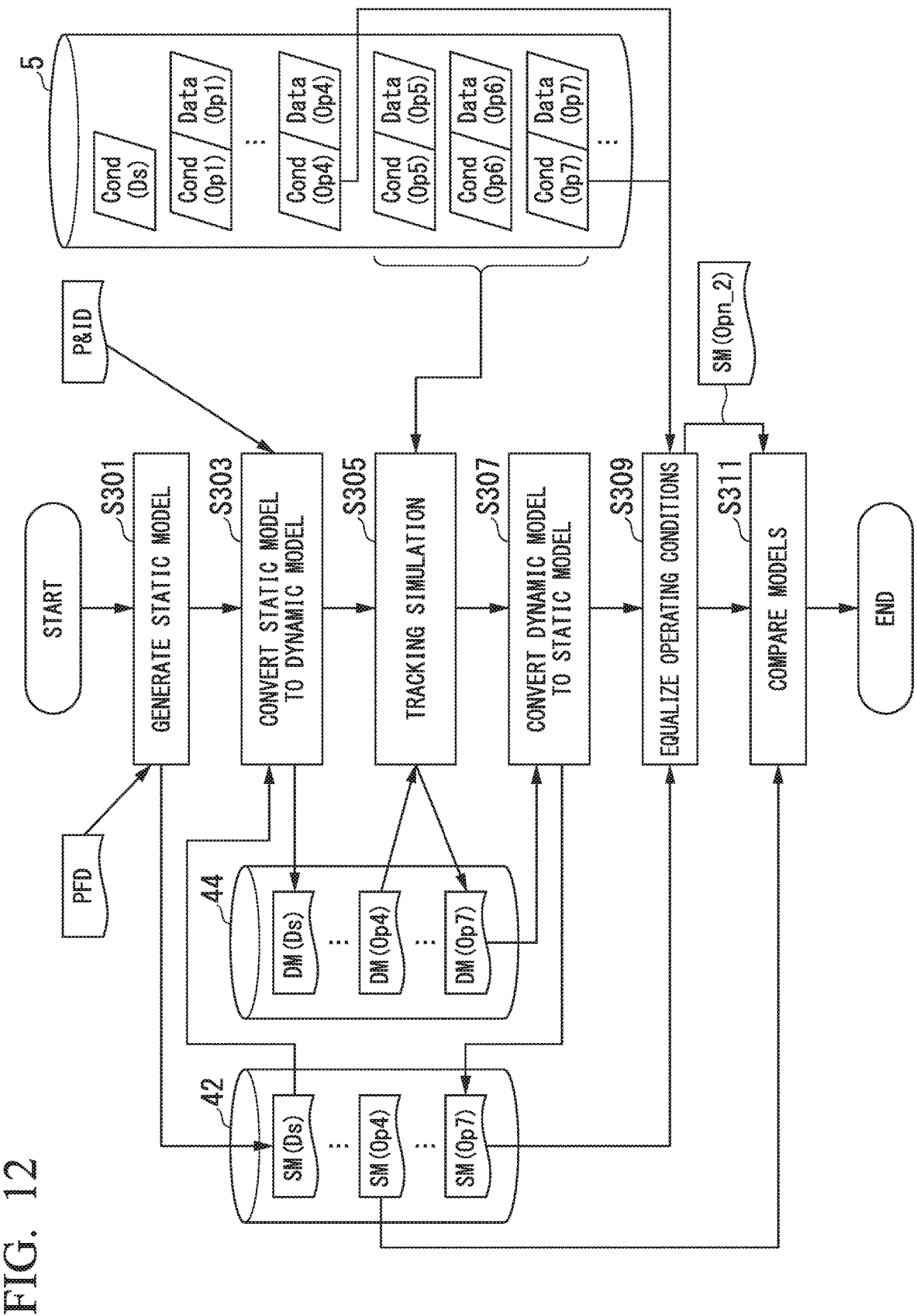
FIG. 12 is a flowchart showing another example of the flow of processing in a plant performance evaluation apparatus in the third embodiment.

Although the description has been of the example in which, in FIG. 10, a comparison is done of the static model (Opn) at the current time with the static model SM (Ds) at the time of design, a comparison may be made of the static model SM (Opn) at the current time and the static model SM at an arbitrary point in time after the start of operation of the plant in the operating phase. For example, consider the case in which, as shown in FIG. 12, of three points in time in the operating phase (the operating conditions Cond (Op5) to (Op7), for n=5 to 7) at which the plant 2 is in a special state (for example, when there is a high production level load or at the time of bad weather). In this case, at step S305, the tracking simulator 49 receives the operating conditions (Cond (Op5) to (Op7)) and the process value (Data (Op5) to (Op7)) at those three points in time and generates the dynamic model DM (Op7) referenced to the dynamic model DM (Op4), which is before the three points in time. Next, the model converter 45 converts the dynamic model DM (Op7) to the static model SM (Op7). In this case, if the comparator 46 compares the static model SM (Op4) with the static model SM (Op7), an evaluation can be made of, for example, the extent that the state of the process units under a heavy production level load in the plant 2 have deviated from the expected state at the time of design.

Although the foregoing is a description of the example in which, at step S309, the static model SM (Opn) operating conditions are made to coincide with the static model SM (Ds) operating conditions, a constitution may be adopted in which, as in the second embodiment, the static model SM (Ds) operating conditions are made to coincide with the static model SM (Opn) operating conditions.

Fourth Embodiment

Next, the fourth embodiment of the present invention will be described. In the third embodiment, the example has been described in which the static model SM (Opn) at the current time is compared with the static model SM (Ds) at the time of design. In contrast, in the fourth embodiment, regarding the process units for which a static model was not generated at the time of design, a comparison is made of the static model generated after the start of plant operation with the static model at the current time. For that reason, in the description of the fourth embodiment, parts that are the same as in the above-noted third embodiment are assigned the same reference numerals and the descriptions thereof will be omitted or simplified.

In the design and construction phase, although the processes and size of equipment are determined by a static simulation, the model of the static simulation used at that time does not necessarily model the entire plant. Given that, in the fourth embodiment, a static model SM is generated with respect to an arbitrary process unit from the dynamic model DM (Op) of the plant at the time of the start of plant 2 operation, and this is taken as the comparison reference (baseline). This enables a difference evaluation even for a process unit for which a model was not generated in the design and construction phase.

(Plant Performance Evaluation Apparatus Operation)

Figure 13:
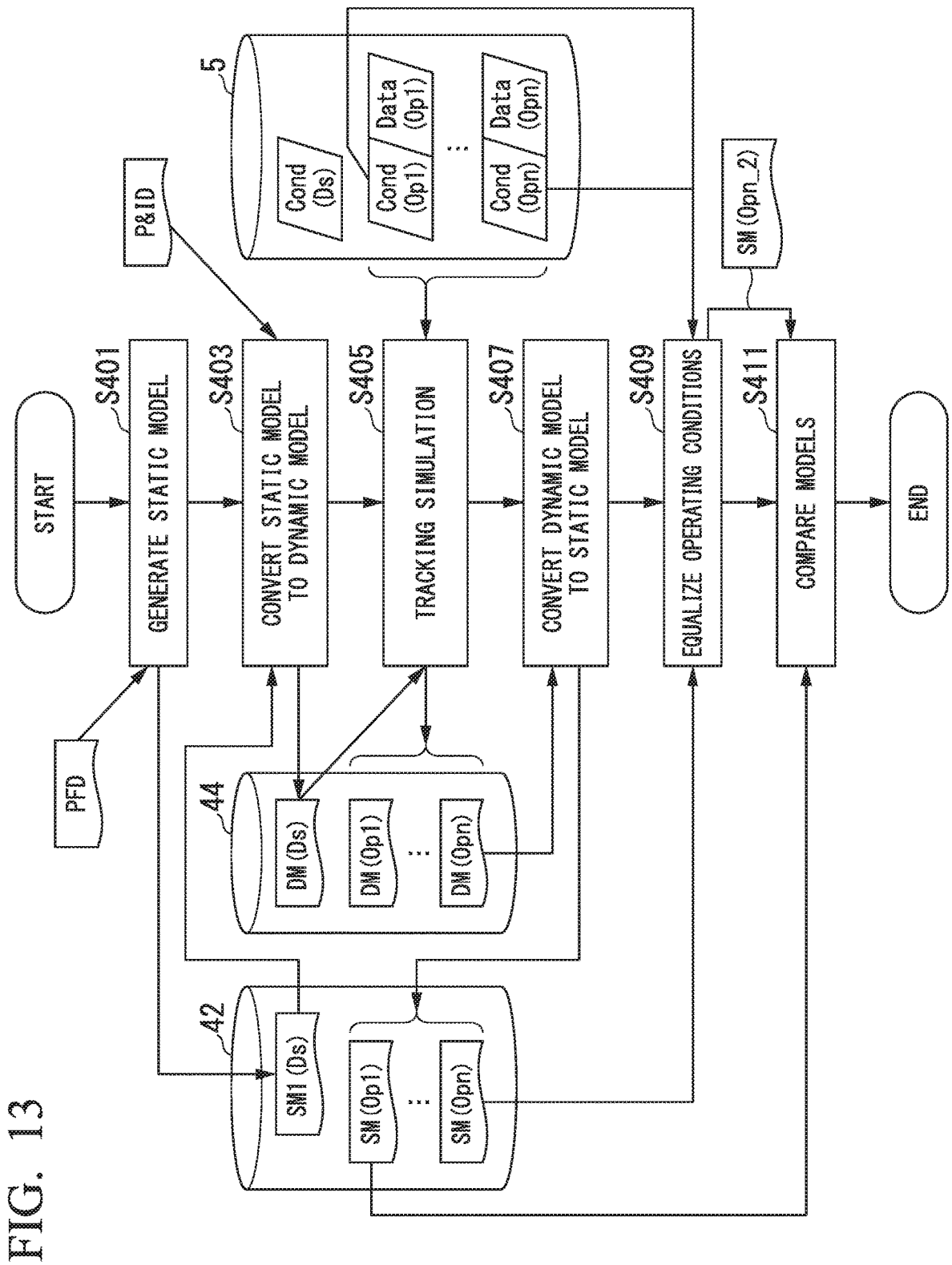
FIG. 13 is a flowchart showing an example of the flow of processing in a plant performance evaluation apparatus in a fourth embodiment.

The operation of the plant performance evaluation apparatus 4A of the fourth embodiment will be described. FIG. 13 is a flowchart showing an example of the flow of processing in the plant performance evaluation apparatus 4A in the fourth embodiment.

In the design and construction phase, for example, if the plant 2 includes a plurality of process units, such as shown in FIG. 2, a process engineer generates a static model SM1 (Ds) with respect to the first process unit (for example, the reaction vessel unit 100 shown in FIG. 2) based on a PFD or the like and stores it into the static model storage 42 (step S401).

Next, at the design and construction phase, the model converter 45 reads out the static model SM1 (Ds) with respect to the first process unit from the static model storage 42, and additionally defines dynamic information after having converted the static model SM1 (Ds) to the dynamic model DM (Ds). Regarding a second process unit for which the static model SM does not exist (for example, the vapor-liquid separation unit 200 and the distillation column unit 300 shown in FIG. 2), the dynamic model DM may be generated manually by a process engineer. The generated dynamic model DM (Ds) is stored into the dynamic model storage 44 (step S403).

Next, in the operating phase, the tracking simulator 49 tunes the parameters of the dynamic model DM (Ds) taking the region shown in FIG. 2 (the reaction vessel unit 100, the vapor-liquid separator unit 200, and the distillation column unit 300) as the target so that the calculation results of the tracking simulator 49 approach the actual plant state (step S405). For example, the tracking simulator 49 reads out the current operating conditions and process values, such as Cond (Op1) and Data (Op1) from the process value database 5. By comparing the simulation results using the dynamic model DM (Ds) with the read-out Cond (Op1) and Data (Op1), the parameters of the dynamic model DM (Ds) are tuned so as to generate the dynamic model DM (Op1).

Next, in the operating phase, the model converter 45 reads out from the dynamic model storage 44 the dynamic model DM (Op1) and, based on the dynamic model DM (Op1), generates the static model SM (Op1) that also includes the second process unit (for example, the reaction vessel unit 100, the vapor-liquid separator unit 200, and the distillation column unit 300 shown in FIG. 2) for which the static model had not been generated at the design and construction phase (Step S407). That is, the static model SM (Opn) converted from the dynamic model DM (Opn) is the static model including the process unit parts for which the static model SM had not been generated at the design and construction phase.

Thereafter, in accordance with the actual plant state, the tracking simulation by the tracking simulator 49 (step S405) and the generation of the static model SM (step S407) are repeated, so as to generate the dynamic models DM (Op2) to DM (Opn) and the static models SM (Op2) to SM (Opn) (where n is a positive integer). The dynamic models DM (Op1) to DM (Opn) are stored into the dynamic model storage 44, and the static models SM (Op1) to SM (Opn) are stored into the static model storage 42.

Next, in the design and construction phase, the operating condition equalizer 47 reads out the static model SM (Opn) stored in the static model storage 42 and the operating conditions Cond (Op1) and Cond (Opn) stored in the process value database 5, and causes the operating conditions of the static model SM (Opn) to coincide with the operating condition Cond (Op1) of the static model SM (Op1) at the time of the generation of the static model SM (Opn) (step S409). The static model SM (Opn) in which the operating conditions have been adjusted will be called the static model SM (Opn_2). If another equalization processing, such as processing performed to equalize the operating conditions in the conversion processing at the above-noted step S407, is not necessary, this step S409 need not be executed.

Next, at the equipment modification phase, the comparator 46 reads out the static model SM (Op1) stored in the static model storage 42 and compares the parameters included in the static model SM (Op1) with the parameters included in the static model SM (Opn_2) which had been equalized by the operating condition equalizer 47, generates a comparison list L1 of the comparison results, and ends the processing of this flowchart (step S411). The comparator 46 may generate a comparison list L1 that extracts only parameters for which a difference has occurred.

According to the fourth embodiment described above, it is possible to evaluate performance of the process unit for which a model had not been generated at the design and construction phase. Also, although in the above, an example in which the static model SM (Opn) before equalizing the operating conditions is stored into the static model storage 42 has been described, the value after equalizing the operating conditions may be stored into the static model storage 42.

Although in the above, the description has been for an example of using the tracking simulator 49, a constitution may be adopted in which the dynamic simulator 43 is used, as in the first embodiment. Also, although in the above, the description has been for an example of causing the operating conditions of static model SM (Opn) at step S409 to coincide with the operating conditions of the static model SM (Op1), a constitution may be adopted, as in the second embodiment, in which the operating conditions of the static model SM (Op1) are made to coincide with the operating conditions of the static model SM (Opn).

Fifth Embodiment

Next, the fifth embodiment of the present invention will be described. The fifth embodiment differs from the first embodiment regarding the further provision of an instrumentation master database. For that reason, in the description of the fifth embodiment, the same reference symbols are applied to parts that are the same as in the first embodiment, and the description thereof will be omitted or simplified.

Figure 14:
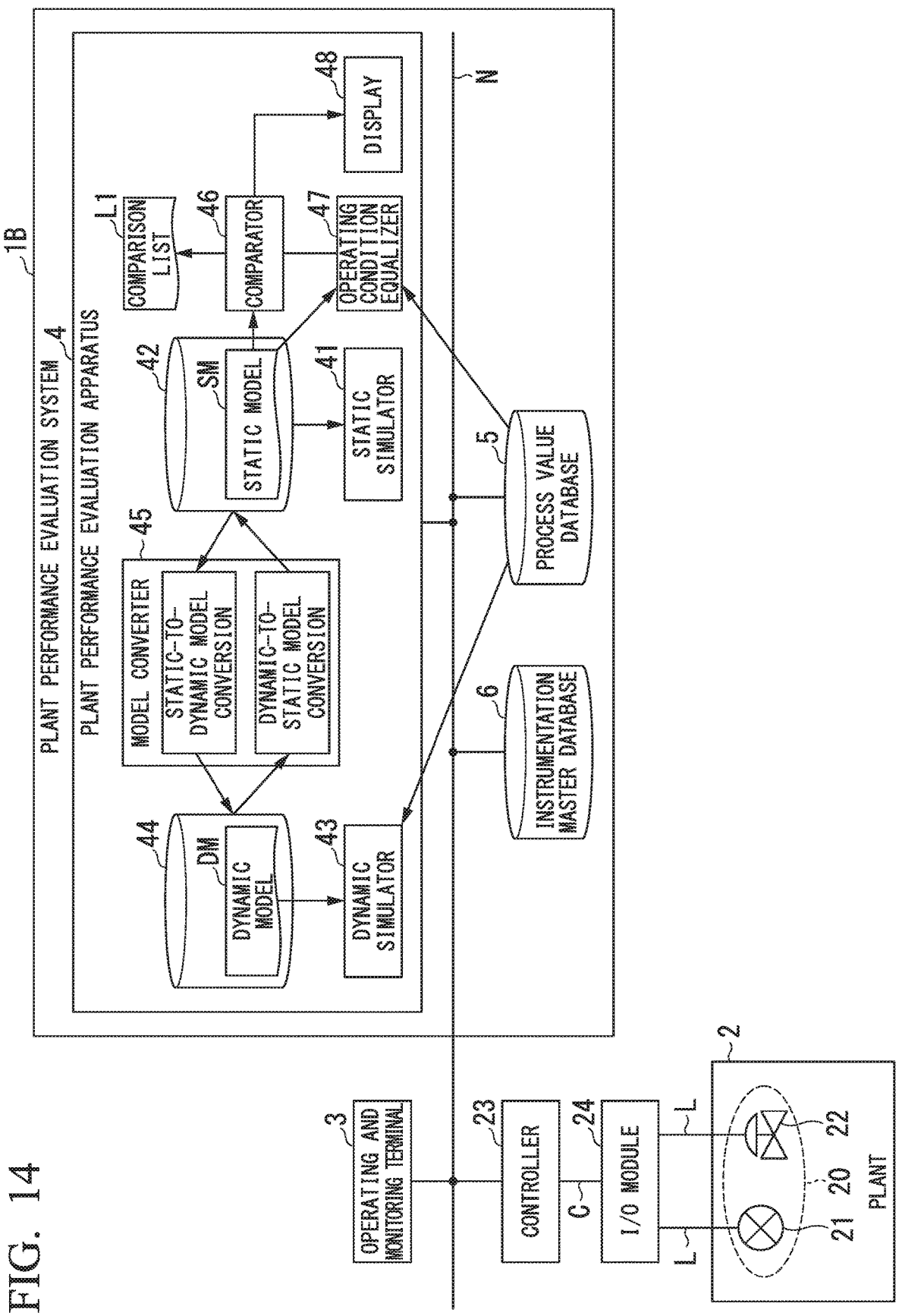
FIG. 14 is a block diagram showing an example of a plant performance evaluation system in a fifth embodiment.

FIG. 14 is a block diagram showing an example of a plant performance evaluation system in the fifth embodiment. The plant performance evaluation system 1B of the fifth embodiment has further an instrumentation master database 6 (second database). During the long plant life cycle, there is a case in which a process unit or instrumentation is replaced or added, or the control program is modified. The instrumentation master database 6 stores device conditions, such as change history information or a P&ID.

(Plant Performance Evaluation Apparatus Operation)

Figure 15:
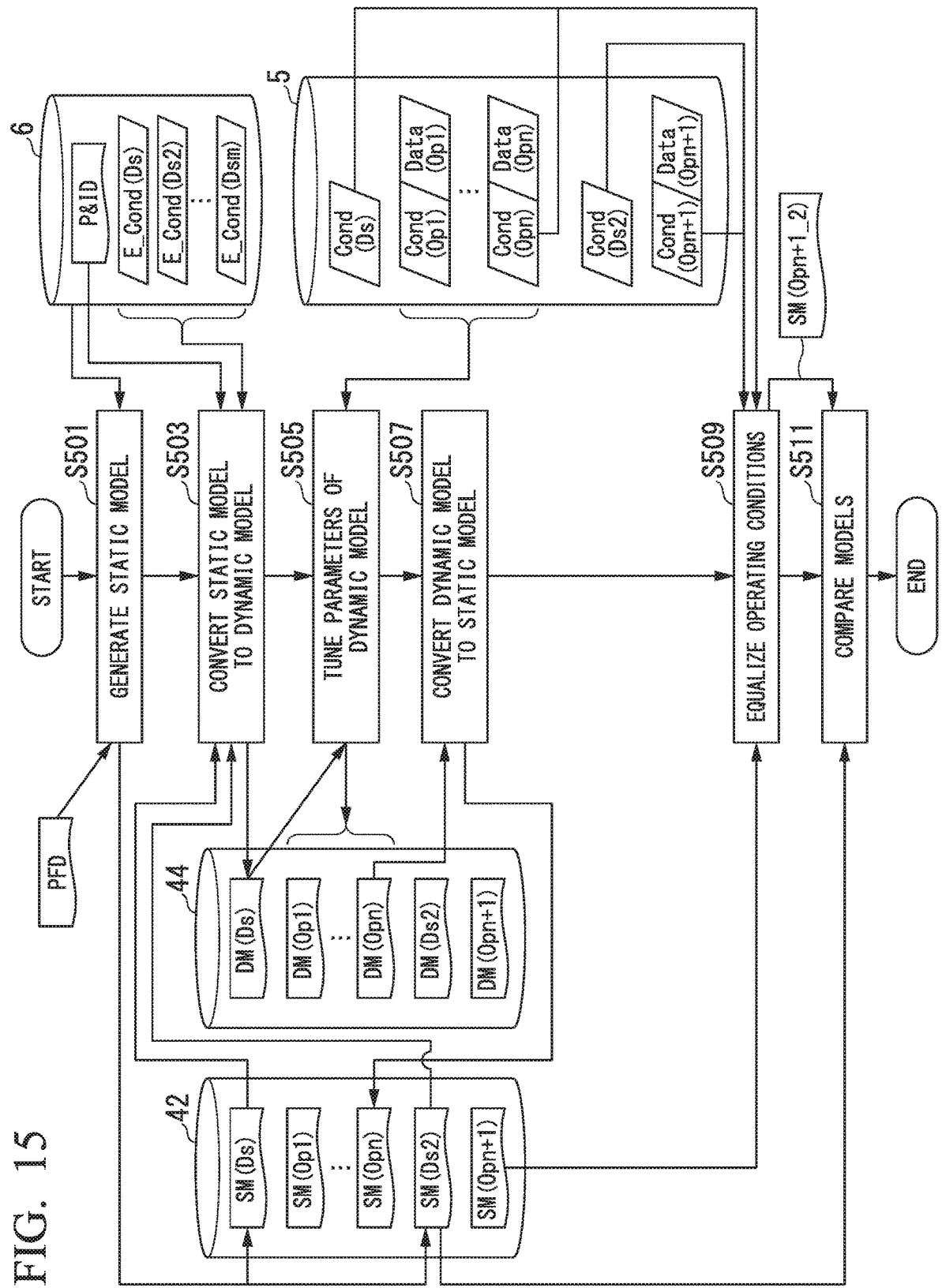
FIG. 15 is a flowchart showing an example of the flow of processing in a plant performance evaluation apparatus in the fifth embodiment.

The operation of the plant performance evaluation apparatus 4 of the fifth embodiment will be described. FIG. 15 is a flowchart showing an example of the flow of processing in the plant performance evaluation apparatus 4 in the fifth embodiment. The instrumentation master database 6 shown in FIG. 15 stores a device condition E_cond (Ds) at the design and construction phase and device conditions E_cond (Ds2) to (Dsm) (where m is a positive integer) at the time of equipment modification at a certain time in the operating phase.

In the design and construction phase, for example, a process engineer generates a static model SM (Ds) based on a PFD or the like and stores it into the static model storage 42 (step S501).

Next, the model converter 45 reads out the static model SM (Ds) stored in the static model storage 42 and the P&ID and E_Cond (Ds) stored in the instrumentation master database 6, additionally defines dynamic information after having converted the static model SM (Ds) to the dynamic model DM (Ds), and stores this into the dynamic model storage 44 (step S503)

Next, in the operating phase, the parameters of the dynamic model DM (Ds) are tuned so that the calculation results of the dynamic simulator 43 approach the actual plant state (step S505). The current operating conditions and process values, such as Cond (Op1) and Data (Op1), are read out from the process value database 5. Next, the simulation results using the dynamic model DM (Ds) are compared with the read-out Cond (Op1) and Data (Op1), and the parameters of the dynamic model DM (Ds) are tuned so as to generate the dynamic model DM (Op1).

Next, in the operating phase, the model converter 45 reads out from the dynamic model storage 44 the dynamic model DM (Op1) and converts the dynamic model DM (Op1) to the static model SM (Op1) (Step S507).

Thereafter, in accordance with the actual plant state, the parameters of the dynamic model DM are tuned (step S505) and the static model SM is generated (step S507), these steps being repeated, so as to generate the dynamic models DM (Op2) to DM (Opn) and the static models SM (Op2) to SM (Opn) (where n is a positive integer). The dynamic models DM (Op1) to DM (Opn) are stored into the dynamic model storage 44, and the static models SM (Op1) to SM (Opn) are stored into the static model storage 42.

Next, in the equipment modification phase, the processing starting at step S501 of FIG. 15 is repeated. At step S501, a new static model SM (Ds2) is generated. If there is a change in the equipment structure, the static model SM (Ds2) is generated based on the equipment condition E_Cond (Ds2). If, however, there is no change in the equipment structure, only the updated parameters of the equipment condition E_Cond (Ds2) are reflected in the static model SM (Opn), and the static model SM (Ds2) is generated. If there is no change in the equipment structure, the static model SM (Ds2) may be generated from the dynamic model DM (Opn+1) that had been tuned after the equipment modification. The generated static model SM (Ds2) is stored in the static model storage 42 (Step S501).

Next, the model converter 45 converts the static model SM to the dynamic model DM (Step S503). If there is a change in the equipment structure, the model converter 45 reads out the static model (Ds2) stored in the static model storage 42 and P&ID and E_Cond (Ds2) stored in the instrumentation master database 6 and additionally defines dynamic information after having converted the static model SM (Ds2) to the dynamic model DM (Ds2). If, however, there is no change in the equipment structure, only updated parameters of the equipment condition E_Cond (Ds2) are reflected in the dynamic model DM (Opn), and the dynamic model DM (Ds2) is generated. If there is no change in the equipment structure, the dynamic model DM (Opn+1) that has been tuned after the equipment modification may be taken as the dynamic model DM (Ds2). The generated static model SM (Ds2) is stored in the dynamic model storage 44. In FIG. 15, the arrow from step S503 toward the dynamic model DM (Ds2) is omitted to simplify the drawing.

Next, in the operating phase, the dynamic model DM (Ds2) are tuned so that the calculation results of the dynamic simulator 43 approach the actual plant state (step S505). For example, the current operating conditions and process values, such as Cond (Opn+1) and Data (Opn+1) are read out from the process value database 5. Next, the simulation results using the dynamic model DM (Ds2) are compared with the read-out Cond (Opn+1) and Data (Opn+1), and the dynamic model DM (Ds2) is tuned so as to generate the dynamic model DM (Opn+1). In FIG. 15, the arrow from the dynamic model DM (Ds2) toward step S505 is omitted to simplify the drawing.

Next, in the operating phase, the model converter 45 reads out from the dynamic model storage 44 the dynamic model DM (Opn+1), and converts the dynamic model DM (Opn+1) to the static model SM (Opn+1) (Step S507). In FIG. 15, the arrow from step S507 toward the static model SM (Opn+1) is omitted to simplify the drawing.

Thereafter, in accordance with the actual plant state, the dynamic model DM is tuned (step S505) and the static model SM is generated (step S507), these steps being repeated, so as to generate the dynamic models DM (Op2+2) and thereafter and the static models SM (Op+2) and thereafter. These dynamic models DM (Opn+1) and thereafter are stored into the dynamic model storage 44, and the static models SM (Opn+1) and thereafter are stored into the static model storage 42.

Next, the operating condition equalizer 47 reads out the static model SM (Opn+1) stored in the static model storage 42 and the operating conditions Cond (Ds2) and Cond (Opn+1) stored in the process value database 5, and causes the operating conditions of the static model SM (Opn+1) to coincide with the operating conditions Cond (Ds2) (step S509). The static model SM (Opn+1) in which the operating conditions have been adjusted will be called the static model SM (Opn+1_2). If another equalization processing, such as processing performed to equalize the operating conditions in the conversion processing at the above-noted step S507, is not necessary, this step S509 need not be executed.

Next, at the equipment modification phase, the comparator 46 reads out the static model SM (Ds2) stored in the static model storage 42 and compares the parameters included in the static model SM (Ds2) with the parameters included in the static model SM (Opn+1_2) which had been equalized by the operating condition equalizer 47, generates a comparison list L1 of the comparison results, and ends the processing of this flowchart (step S511). The comparator 46 may generate a comparison list L1 that extracts only parameters for which a difference has occurred.

Figure 16:
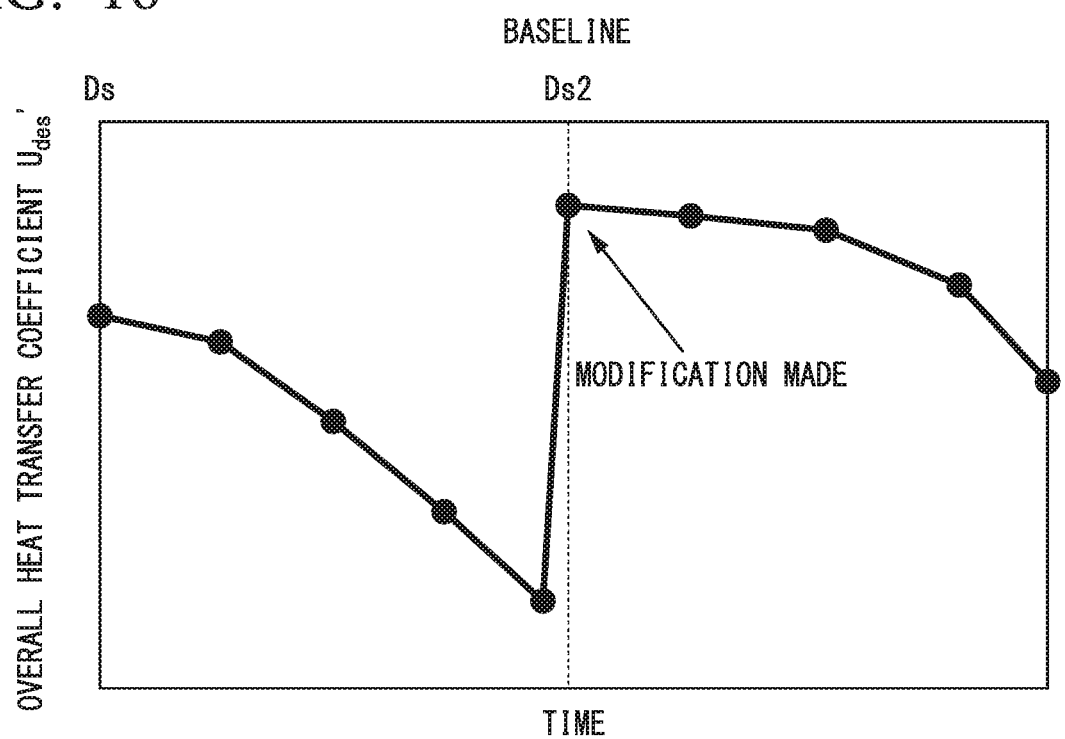
FIG. 16 a graph showing an example of the change with aging of the overall heat transfer coefficient $U_{des}'$ during operation of the heat exchanger before and after modifying the equipment shown in FIG. 7 in the fifth embodiment.

According to the fifth embodiment described above, after equipment modification, the operating condition equalizer 47 and the comparator 46 take SM (Ds2) as the baseline. For example, as shown by the trend display of FIG. 16 (which has two horizontal axes, the upper of which represents the baseline date/time and the lower of which represents the time) that shows an example of the change with aging of the overall heat transfer coefficient $U_{des}'$ during operation of the heat exchanger shown in FIG. 7, it is possible to visually grasp the point in time of device conditions changing, displaying the trend before the equipment modification and the trend after equipment modification together. The baseline date/time shows the time that the equipment modification (or the time that the first model was generated after the equipment modification). This enables a comparison of the effect of before and after an equipment modification. Because the instrumentation master database 6 holds not only device conditions, but also changes in related control logic, and a history of the changes of control parameters, it can provide an integrated view of what had been changed at the time of an equipment modification and how the process changed as a result, and an active or passive change points related to equipment modification.

Using the plant operating conditions, by equalizing the static model SM (Opn), it is possible to generate a highly accurate model.

Although the foregoing has been a description of an example in which, at step S509, the static model SM (Opn) operating conditions are made to coincide with the static model SM (Ds) operating conditions, a constitution may be adopted in which, as in the second embodiment, the static model SM (Ds) operating conditions are made to coincide with the static model (Opn) operating conditions. Although the foregoing has been a description of an example of using the dynamic simulator 43, a constitution may be adopted that uses the tracking simulator 49, such as shown in the third embodiment. Also, although the foregoing has been a description of an example in which the static model SM (Ds) generated at the design and construction phase is compared with the static model SM (Opn), a constitution may be adopted in which, as in the fourth embodiment, regarding a process unit for which the static model SM (Ds) has not been generated at the design and construction phase, a comparison is done between static models SM that are generated in the operating phase.

Although in the above-described first through fifth embodiments, the description has been for an example in which the plant performance evaluation apparatus (4, 4A, 4B) and the process value database 5 are connected to the plant 2 via the network N, the simulations in the plant performance evaluation apparatus (4, 4A, 4B) may be performed with the plant performance evaluation apparatus (4, 4A, 4B) and the process value database 5 separated (offline) from the plant 2.

Although preferred embodiments of the present invention have been described above, with references made to the accompanying drawings, it will be understood that the present invention is not restricted to the foregoing embodiments. The configurations and combinations of the constituent elements in the above-described embodiments are exemplary, and can be variously modified, based on design requirements, within the scope of the spirit of the present invention.

What is claimed is:

1. A plant performance evaluation apparatus comprising:
    a first storage storing a first static model indicating a model of a first steady state, the first steady state indicating a state in which input and output of process units included in a plant are fixed with time;
    a second storage storing a first dynamic model indicating a model of a dynamic state, the first dynamic model including parameters with time dependence in the process units;
    a simulator configured to simulate operation in the dynamic state using the first dynamic model and based on the simulation result, to adjust the first dynamic model;
    a model converter configured to convert the adjusted first dynamic model to a second static model indicating a model of a second steady state, the second steady state indicating a state in which the input and output of the process units are fixed with time, and to store the second static model into the first storage, the first steady state indicating a steady state of the process units temporally before the second steady state;
    an operating condition equalizer configured to equalize operating conditions of the process units at the time of generation of the first static model and operating conditions of the process units at the time of generation of the second static model;
    a comparator configured to compare parameters included in equations indicating the first static model with parameters included in equations indicating the second static model, the first static model and the second static model having been equalized by the operating condition equalizer, and to output a comparison result; and
    a display configured to display the comparison result output from the comparator.

2. The plant performance evaluation apparatus according to claim 1, wherein the model converter is configured to remove the parameters with time dependence included in the equations indicating the adjusted first dynamic model or to make the parameters constant to convert the adjusted first dynamic model to the second static model.

3. The plant performance evaluation apparatus according to claim 1, wherein the first static model is generated at the time the plant was designed.

4. The plant performance evaluation apparatus according to claim 1, wherein the comparator is configured to compare the parameters included in the equations indicating the first static model with the parameters included in the equations indicating the second static model and to extract parameters having a difference.

5. The plant performance evaluation apparatus according to claim 1, wherein the model converter is configured to convert the first static model to generate the first dynamic model.

6. The plant performance evaluation apparatus according to claim 1, wherein the operating condition equalizer is configured to cause the operating conditions of the process units at the time of generation of the first static model to coincide with the operating conditions of the process units at the time of generation of the second static model or to cause the operating conditions of the process units at the time of generation of the second static model to coincide with the operating conditions of the process units at the time of generation of the first static model.

7. The plant performance evaluation apparatus according to claim 1, wherein the first static model is generated at the time of operating the plant.

8. The plant performance evaluation apparatus according to claim 1, wherein the model converter is configured to convert the first static model to the first dynamic model, based on the first static model and change history information of process units included in the plant.

9. A plant performance evaluation system comprising:
a plant performance evaluation apparatus comprising:
a first storage storing a first static model indicating a model of a first steady state, the first steady state indicating a state in which input and output of process units included in a plant are fixed with time;
a second storage storing a first dynamic model indicating a model of a dynamic state, the first dynamic model including parameters with time dependence in the process units;
a simulator configured to simulate operation in the dynamic state using the first dynamic model and based on the simulation result, to adjust the first dynamic model;
a model converter configured to convert the adjusted first dynamic model to a second static model indicating a model of a second steady state, the second steady state indicating a state in which the input and output of the process units are fixed with time, and to store the second static model into the first storage, the first steady state indicating a steady state of the process units temporally before the second steady state;
an operating condition equalizer configured to equalize operating conditions of the process units at the time of generation of the first static model and operating conditions of the process units at the time of generation of the second static model;
a comparator configured to compare parameters included in equations indicating the first static model with parameters included in equations indicating the second static model, the first static model and the second static model having been equalized by the operating condition equalizer, and to output a comparison result; and
a display configured to display the comparison results output from the comparator;
a first database storing operating conditions and process values of process units included in the plant; and
a second database storing modification history information of the process units.

10. A plant performance evaluation method using a first static model and a second static model, the first static model indicating a model of a first steady state, the first steady state indicating a state in which input and output of process units included in a plant are fixed with time, the second static model indicating a model of a second steady state, the second steady state indicating a state in which the input and output of the process units included in the plant are fixed with time, comprising:
simulating operation in a dynamic state of a plant using a first dynamic model indicating a model of the dynamic state, the first dynamic model including parameters with time dependence in the process units, and based on the simulation result, adjusting the first dynamic model;
converting the adjusted first dynamic model to the second static model;
equalizing operating conditions of the process units at the time of generation of the first static model and operating conditions of the process units at the time of generation of the second static model, the first steady state indicating a steady state of the process units temporally before the second steady state;
comparing parameters included equations indicating in the first static model with parameters included equations indicating in the second static model, the first static model and the second static model having been equalized, and outputting a comparison result; and
displaying the comparison result.

11. The plant performance evaluation apparatus according to claim 1, wherein the process units include a heat exchanger,
the equations indicating each of the first static model, the second static model, the first dynamic model express an overall heat transfer coefficient of the heat exchanger, and
the comparator is configured to compare the overall heat transfer coefficient included in the equations indicating the first static model with the overall heat transfer coefficient included in the equations indicating the second static model, the first static model and the second static model having been equalized by the operating condition equalizer, and to output the comparison result.

12. The plant performance evaluation system according to claim 9, wherein the process units include a heat exchanger,
the equations indicating each of the first static model, the second static model, the first dynamic model express an overall heat transfer coefficient of the heat exchanger, and
the comparator is configured to compare the overall heat transfer coefficient included in the equations indicating the first static model with the overall heat transfer coefficient included in the equations indicating the second static model, the first static model and the second static model having been equalized by the operating condition equalizer, and to output the comparison result.

13. The plant performance evaluation method according to claim 10, wherein the process units include a heat exchanger,
the equations indicating each of the first static model, the second static model, the first dynamic model express an overall heat transfer coefficient of the heat exchanger, and
the comparison comprises comparing the overall heat transfer coefficient included in the equations indicating the first static model with the overall heat transfer coefficient included in the equations indicating the second static model, the first static model and the second static model having been equalized, and outputting the comparison result.

* * * * *